US012647810B2

(12) United States Patent
Hindy et al.

(10) Patent No.: US 12,647,810 B2
(45) Date of Patent: Jun. 2, 2026

(54) CHANNEL STATE INFORMATION REPORTING FOR MULTIPLE TRANSMIT/RECEIVE POINTS AND FREQUENCY DIVISION DUPLEX RECIPROCITY

(71) Applicant: Lenovo (Singapore) Pte. Ltd., New Tech Park (SG)

(72) Inventors: Ahmed Monier Ibrahim Saleh Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 243 days.

(21) Appl. No.: 18/263,515

(22) PCT Filed: Jan. 28, 2022

(86) PCT No.: PCT/IB2022/050737
§ 371 (c)(1),
(2) Date: Jul. 28, 2023

(87) PCT Pub. No.: WO2022/162593
PCT Pub. Date: Aug. 4, 2022

(65) Prior Publication Data
US 2024/0129776 A1     Apr. 18, 2024

Related U.S. Application Data

(60) Provisional application No. 63/142,964, filed on Jan. 28, 2021.

(51) Int. Cl.
*H04L 5/00*       (2006.01)
*H04W 24/10*      (2009.01)

(52) U.S. Cl.
CPC ........... *H04W 24/10* (2013.01); *H04L 5/0035* (2013.01); *H04L 5/0057* (2013.01)

(58) Field of Classification Search
CPC ..... H04W 24/10; H04L 5/0035; H04L 5/0057
(Continued)

(56) References Cited

U.S. PATENT DOCUMENTS

2016/0352487 A1 * 12/2016 Chen ..................... H04B 7/084
2020/0106487 A1    4/2020 Christodoulou et al.

FOREIGN PATENT DOCUMENTS

WO          2020056708 A1     3/2020

OTHER PUBLICATIONS

PCT/IB2022/050737, "Notification of Transmittal of the International Search Report and the Written Opinion of the International Searching Authority, or the Declaration", International Searching Authority, May 11, 2022, pp. 1-17.
(Continued)

*Primary Examiner* — Christopher R Crompton
(74) *Attorney, Agent, or Firm* — Kunzler Needham & Hilton

(57) ABSTRACT

Various aspects of the present disclosure relate to channel state information reporting for multiple transmit/receive points and frequency division duplex reciprocity. One apparatus includes at least one memory and at least one processor that is configured to a channel state information ("CSI") reporting configuration, the CSI reporting configuration comprising an indicator of multi-point transmission, and a configuration comprising at least two groups of channel measurement resources ("CMRs"). The at least one processor determines at least one CSI report based on the at least two groups of CMRs, the at least one CSI report mapped to a transmission hypothesis corresponding to one of a single-point transmission and a multi-point transmission. The at
(Continued)

1200

Start

1205 — sending, to a user equipment ("UE") device, a channel state information ("CSI") reporting configuration, the CSI reporting configuration comprising an indicator of multi-point transmission 1210 — sending, to the UE device, a configuration comprising at least two groups of channel measurement resources ("CMRs")

1215 — receiving, from the UE device, at least one CSI report, the at least one CSI report ordered according to a predefined priority End least one processor transmits the at least one CSI report to the mobile wireless communication network, the at least one CSI report ordered according to a predefined priority.

20 Claims, 18 Drawing Sheets

(58) Field of Classification Search
USPC ......................................................... 370/252
See application file for complete search history.

(56) References Cited

OTHER PUBLICATIONS

Samsung et al., "WF on Type I and II CSI codebooks", 3GPP TSG-RAN WG1 #89 R1-1709232, May 15-19, 2017, pp. 1-24.
Spreadtrum Communications, "Discussion on Multi-TRP transmission", 3GPP TSG RAN WG1 Meeting #AH1901 R1-1900711, Jan. 21-25, 2019, pp. 1-6.
Huawei et al., "CSI measurement enhancement for multi-TRP/panel transmission", 3GPP TSG RAN WG1 Ad-Hoc Meeting 1901 R1-1900849, Jan. 21-25, 2019, pp. 1-5.
Huawei et al., "CSI measurement enhancement for multi-TRP/panel transmission", 3GPP TSG RAN WG1 Meeting #97 R1-1906038, May 13-17, 2019, pp. 1-4.
LG Electronics, "Discussion on CSI enhancement for NCJT", 3GPP TSG RAN WG1 #97 R1-1906736, May 13-17, 2019, pp. 1-3.
Ericsson, "Views on CSI framework for multi-TRP", 3GPP TSG RAN WG1 Meeting #97 R1-1907424, May 13-17, 2019, pp. 1-2.
Spreadtrum Communications, "Discussion on CSI enhancement for multiple TRP/Panel transmission", 3GPP TSG RAN WG1 #98 R1-1908961, Aug. 26-30, 2019, pp. 1-4.
3GPP, "3rd Generation Partnership Project; Technical Specification Group Radio Access Network; NR; Multiplexing and channel coding (Release 16)", 3GPP TS 38.212 V16.3.0, Sep. 2020, pp. 1-152.
3GPP, "3rd Generation Partnership Project; Technical Specification Group Radio Access Network; NR; Physical layer procedures for data (Release 16)", 3GPP TS 38.214 V16.3.0, Sep. 2020, pp. 1-166.
3GPP, "3rd Generation Partnership Project; Technical Specification Group Radio Access Network; NR; Radio Resource Control (RRC) protocol specification (Release 16)", 3GPP TS 38.331 V16.2.0, Sep. 2020, pp. 1-921.

* cited by examiner

300

304

302

CSI Request Field = 2

1

2

S

306

ReportConfigID x    308

ReportConfigID y    310

ReportConfigID z    312

400

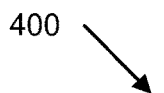

```
CSI-AperiodicTriggerState ::= SEQUENCE {
        associatedReportConfigInfoList      SEQUENCE (SIZE(1..maxNrofReportConfigPerAperiodicTrigger))
                                                OF CSI-AssociatedReportConfigInfo,
        . . .
}

CSI-AssociatedReportConfigInfo ::= SEQUENCE {
        reportConfigId                      CSI-ReportConfigId,
        resourcesForChannel                 CHOICE{
            nzp-CSI-RS SEQUENCE {
                resourceSet                 INTEGER (1..maxNrofNZP-CSI-ResourceSetsPerConfig),
                qcl-info                    SEQUENCE (SIZE(1..maxNrofAP-CSI-RS-ResourcesPerSet))
                                                OF TCI-StateId OPTIONAL – Cond Aperiodic
            },
            csi-SSB-ResourceSet             INTEGER (1..maxNrofCSI-SSB-ResourceSetsPerConfig)
        },
        csi-IM-ResourcesForInterference                 INTEGER(1..maxNrofCSI-IM-ResourceSetsPerConfig),
        nzp-CSI-RS-ResourcesForInterference             INTEGER (1..maxNrofNZP-CSI-RS-ResourceSetsPerConfig)
        . . .
}
```

```
NZP-CSI-RS-Resource ::= SEQUENCE {
        nzp-CSI-RS-ResourceId   NZP-CSI-RS-ResourceId,
        resourceMapping         CSI-RS-ResourceMapping,
        powerControlOffset      INTEGER (-8..15),
        powerControlOffsetSS    ENUMERATED{db-3, db0, db3, db6} OPTIONAL, -- Need R
        scramblingID            ScramblingId,
        periodicityAndOffset    CSI-ResourcePeriodicityAndOffset OPTIONAL, -
        qcl-InfoPeriodicCSI-RS  TCI-StateId OPTIONAL, -- Cond Periodic
        . . .
}
```

```
CSI-IM-Resource ::= SEQUENCE {
        csi-IM-ResourceId                   CSI-IM-ResourceId,
        csi-IM-ResourceElementPattern       CHOICE {
            pattern0 SEQUENCE {
                subcarrierLocation-p0       ENUMERATED { s0, s2, s4, s6, s8, s10 },
                symbolLocation-p0           INTEGER (0..12)
            },
            pattern1 SEQUENCE {
                subcarrierLocation-p1       ENUMERATED { s0, s4, s8 },
                symbolLocation-p1           INTEGER (0..13)
            }
        } OPTIONAL, -- Need M
        freqBand                            CSI-FrequencyOccupation OPTIONAL,
        periodicityAndOffset                CSI-ResourcePeriodicityAndOffset OPTIONAL,
        PeriodicOrSemiPersistent
    . . .
}
```

```
-- ASN1START
-- TAG-CSI-REPORTCONFIG-START

CSI-ReportConfig ::=          SEQUENCE {
  reportConfigId                CSI-ReportConfigId,
  carrier                       ServCellIndex          OPTIONAL,  -- Need S
  resourcesForChannelMeasurement        CSI-ResourceConfigId,
  csi-IM-ResourcesForInterference        CSI-ResourceConfigId     OPTIONAL,  -- Need R
  nzp-CSI-RS-ResourcesForInterference    CSI-ResourceConfigId     OPTIONAL,  -- Need R reportConfigType              CHOICE {
    periodic                    SEQUENCE {
      reportSlotConfig          CSI-ReportPeriodicityAndOffset,
      pucch-CSI-ResourceList        SEQUENCE (SIZE (1..maxNrofBWPs)) OF PUCCH-CSI-Resource
    },
    semiPersistentOnPUCCH           SEQUENCE {
      reportSlotConfig          CSI-ReportPeriodicityAndOffset,
      pucch-CSI-ResourceList        SEQUENCE (SIZE (1..maxNrofBWPs)) OF PUCCH-CSI-Resource
    },
    semiPersistentOnPUSCH           SEQUENCE {
      reportSlotConfig          ENUMERATED {sl5, sl10, sl20, sl40, sl80, sl160, sl320},
      reportSlotOffsetList      SEQUENCE (SIZE (1.. maxNrofUL-Allocations)) OF INTEGER(0..32),
      p0alpha                   P0-PUSCH-AlphaSetId
    },
    aperiodic                   SEQUENCE {
      reportSlotOffsetList      SEQUENCE (SIZE (1..maxNrofUL-Allocations)) OF INTEGER(0..32)
    }
  },
      mTRPCSIEnabled            ENUMERATED (TRUE)          OPTIONAL,  -- Need R
702
  [.................................]

-- TAG-CSI-REPORTCONFIG-STOP
-- ASN1STOP
```

FIG. 7A

```
-- ASN1START
-- TAG-CSI-REPORTCONFIG-START

CSI-ReportConfig ::=          SEQUENCE {
  reportConfigId                CSI-ReportConfigId,
  carrier                       ServCellIndex          OPTIONAL,  -- Need S
  resourcesForChannelMeasurement        CSI-ResourceConfigId,
  csi-IM-ResourcesForInterference        CSI-ResourceConfigId    OPTIONAL,  -- Need R
  nzp-CSI-RS-ResourcesForInterference    CSI-ResourceConfigId    OPTIONAL,  -- Need R reportConfigType              CHOICE {
    periodic                    SEQUENCE {
      reportSlotConfig          CSI-ReportPeriodicityAndOffset,
      pucch-CSI-ResourceList        SEQUENCE (SIZE (1..maxNrofBWPs)) OF PUCCH-CSI-Resource
    },
    semiPersistentOnPUCCH           SEQUENCE {
      reportSlotConfig          CSI-ReportPeriodicityAndOffset,
      pucch-CSI-ResourceList        SEQUENCE (SIZE (1..maxNrofBWPs)) OF PUCCH-CSI-Resource
    },
    semiPersistentOnPUSCH           SEQUENCE {
      reportSlotConfig          ENUMERATED {sl5, sl10, sl20, sl40, sl80, sl160, sl320},
      reportSlotOffsetList      SEQUENCE (SIZE (1.. maxNrofUL-Allocations)) OF INTEGER(0..32),
      p0alpha                   P0-PUSCH-AlphaSetId
    },
    aperiodic                   SEQUENCE {
      reportSlotOffsetList      SEQUENCE (SIZE (1..maxNrofUL-Allocations)) OF INTEGER(0..32)
    }
  },
      numberOfReports                   ENUMERATED {1,2,3,4}     OPTIONAL,  -- Need R
704
  [...............................]

-- TAG-CSI-REPORTCONFIG-STOP
-- ASN1STOP
```

FIG. 7B

```
-- ASN1START
-- TAG-CODEBOOKCONFIG-START

CodebookConfig ::=              SEQUENCE {
   codebookType                 CHOICE {

[..............................]
   }
         numReports            ENUMERATED {1,2}        OPTIONAL,    -- Need R
}
  706
CodebookConfig-r16  ::=        SEQUENCE {
   codebookType                  CHOICE {

[..............................]
   }
         numReports            ENUMERATED {1,2}        OPTIONAL,    -- Need R
}
  708
-- TAG-CODEBOOKCONFIG-STOP
-- ASN1STOP
```

FIG. 7C

```
-- ASN1START
-- TAG-CSI-REPORTCONFIG-START

CSI-ReportConfig ::=          SEQUENCE {
  reportConfigId                CSI-ReportConfigId,
  carrier                      ServCellIndex          OPTIONAL,  -- Need S
  resourcesForChannelMeasurement        CSI-ResourceConfigId,
  csi-IM-ResourcesForInterference       CSI-ResourceConfigId      OPTIONAL,  -- Need R
  nzp-CSI-RS-ResourcesForInterference   CSI-ResourceConfigId      OPTIONAL,  -- Need R

[.............................]

timeRestrictionForChannelMeasurements     ENUMERATED {configured, notConfigured},
  timeRestrictionForInterferenceMeasurements  ENUMERATED {configured, notConfigured},
  codebookConfig                CodebookConfig          OPTIONAL,  -- Need R
  codebookConfig2               CodebookConfig          OPTIONAL,  -- Need R
         dummy                  ENUMERATED {n1, n2}       OPTIONAL,  -- Need R
710
[.............................]

reportQuantity-r16            CHOICE {
    cri-SINR-r16                NULL,
    ssb-Index-SINR-r16          NULL
  }                                 OPTIONAL,  -- Need R
  codebookConfig-r16            CodebookConfig-r16       OPTIONAL  -- Need R
  codebookConfig2-r17           CodebookConfig-r17       OPTIONAL  -- Need R
  ]]
}       712

[.............................]

-- TAG-CSI-REPORTCONFIG-STOP
-- ASN1STOP
```

FIG. 7D

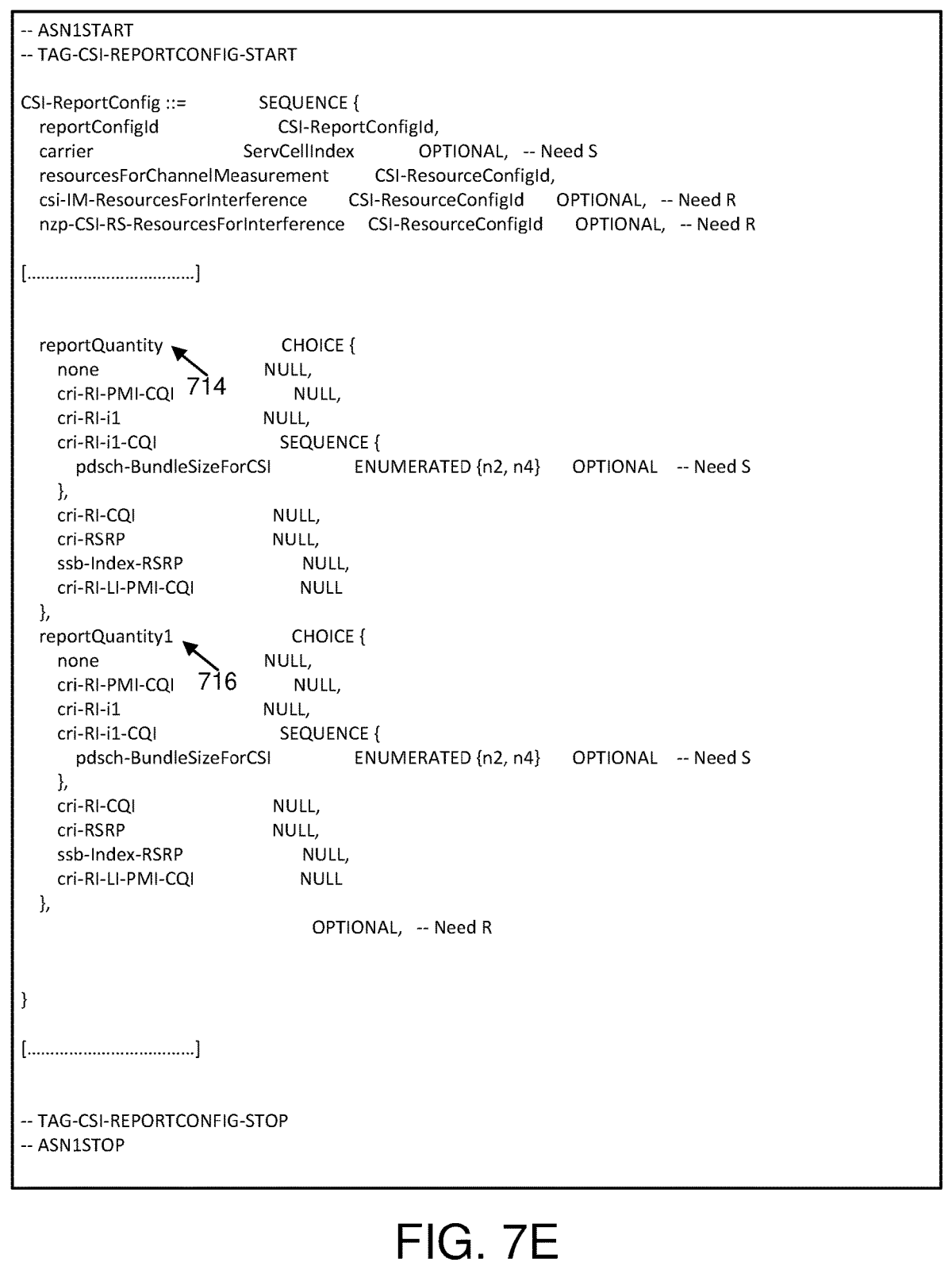

```
-- ASN1START
-- TAG-CSI-REPORTCONFIG-START

CSI-ReportConfig ::=          SEQUENCE {
  reportConfigId               CSI-ReportConfigId,
  carrier                      ServCellIndex        OPTIONAL,  -- Need S
  resourcesForChannelMeasurement       CSI-ResourceConfigId,
  csi-IM-ResourcesForInterference      CSI-ResourceConfigId    OPTIONAL,  -- Need R
  nzp-CSI-RS-ResourcesForInterference  CSI-ResourceConfigId     OPTIONAL,  -- Need R

[...............................]

reportQuantity               CHOICE {
    none                       NULL,
    cri-RI-PMI-CQI    714       NULL,
    cri-RI-i1                  NULL,
    cri-RI-i1-CQI              SEQUENCE {
      pdsch-BundleSizeForCSI          ENUMERATED {n2, n4}     OPTIONAL   -- Need S
    },
    cri-RI-CQI               NULL,
    cri-RSRP                 NULL,
    ssb-Index-RSRP             NULL,
    cri-RI-LI-PMI-CQI          NULL
  },
  reportQuantity1              CHOICE {
    none                       NULL,
    cri-RI-PMI-CQI    716       NULL,
    cri-RI-i1                  NULL,
    cri-RI-i1-CQI              SEQUENCE {
      pdsch-BundleSizeForCSI          ENUMERATED {n2, n4}     OPTIONAL   -- Need S
    },
    cri-RI-CQI               NULL,
    cri-RSRP                 NULL,
    ssb-Index-RSRP             NULL,
    cri-RI-LI-PMI-CQI          NULL
  },
                              OPTIONAL,  -- Need R

}

[...............................]

-- TAG-CSI-REPORTCONFIG-STOP
-- ASN1STOP
```

FIG. 7E

```
-- ASN1START
-- TAG-CODEBOOKCONFIG-START

CodebookConfig ::=              SEQUENCE {
  codebookType                 CHOICE {
[................................]
  }
}

CodebookConfig-r16 ::=             SEQUENCE {
  codebookType                 CHOICE {
[................................]
  }
}              802

CodebookConfig-r17 ::=        SEQUENCE {
  codebookType                 CHOICE {
    type2                   SEQUENCE {
      subType                CHOICE {
        typeII-PortSelection-r17        SEQUENCE {
[................................]
      },
    numberOfPMI-SubbandsPerCQI-Subband-r17 INTEGER (1..4),
    paramCombination-r17          INTEGER (1..8)
    }
  }
}

-- TAG-CODEBOOKCONFIG-STOP
-- ASN1STOP
```

FIG. 8A

```
-- ASN1START
-- TAG-CSI-REPORTCONFIG-START

CSI-ReportConfig ::=          SEQUENCE {
  reportConfigId              CSI-ReportConfigId,
  carrier                     ServCellIndex        OPTIONAL,  -- Need S
  resourcesForChannelMeasurement      CSI-ResourceConfigId,
  csi-IM-ResourcesForInterference      CSI-ResourceConfigId    OPTIONAL,  -- Need R
  nzp-CSI-RS-ResourcesForInterference  CSI-ResourceConfigId    OPTIONAL,  -- Need R reportConfigType            CHOICE {
    periodic                  SEQUENCE {
      reportSlotConfig        CSI-ReportPeriodicityAndOffset,
      pucch-CSI-ResourceList      SEQUENCE (SIZE (1..maxNrofBWPs)) OF PUCCH-CSI-Resource
    },
    semiPersistentOnPUCCH       SEQUENCE {
      reportSlotConfig        CSI-ReportPeriodicityAndOffset,
      pucch-CSI-ResourceList      SEQUENCE (SIZE (1..maxNrofBWPs)) OF PUCCH-CSI-Resource
    },
    semiPersistentOnPUSCH       SEQUENCE {
      reportSlotConfig        ENUMERATED {sl5, sl10, sl20, sl40, sl80, sl160, sl320},
      reportSlotOffsetList      SEQUENCE (SIZE (1.. maxNrofUL-Allocations)) OF INTEGER(0..32),
      p0alpha                 P0-PUSCH-AlphaSetId
    },
    aperiodic                 SEQUENCE {
      reportSlotOffsetList      SEQUENCE (SIZE (1..maxNrofUL-Allocations)) OF INTEGER(0..32)
    }
  },
      channelReciprocity                        ENUMERATED (TRUE)        OPTIONAL,
-- Need R
                              ◄— 804

[..............................]

-- TAG-CSI-REPORTCONFIG-STOP
-- ASN1STOP
```

FIG. 8B

```
-- ASN1START
-- TAG-CODEBOOKCONFIG-START

CodebookConfig ::=              SEQUENCE {
   codebookType                CHOICE {
[...............................]
   }
}

CodebookConfig-r16 ::=              SEQUENCE {
   codebookType                CHOICE {
[...............................]
   }                   806
}

CodebookConfig-r17  ::=        SEQUENCE {
   codebookType                CHOICE {
     type2                   SEQUENCE {
       subType                 CHOICE {
          typeII-PortSelection-r17        SEQUENCE {
[...............................]
           channelReciprocity           ENUMERATED (TRUE)          OPTIONAL, -- Need R
       },
     numberOfPMI-SubbandsPerCQI-Subband-r17 INTEGER (1..4),
     paramCombination-r17         INTEGER (1..8)
     }
   }
}

-- TAG-CODEBOOKCONFIG-STOP
-- ASN1STOP
```

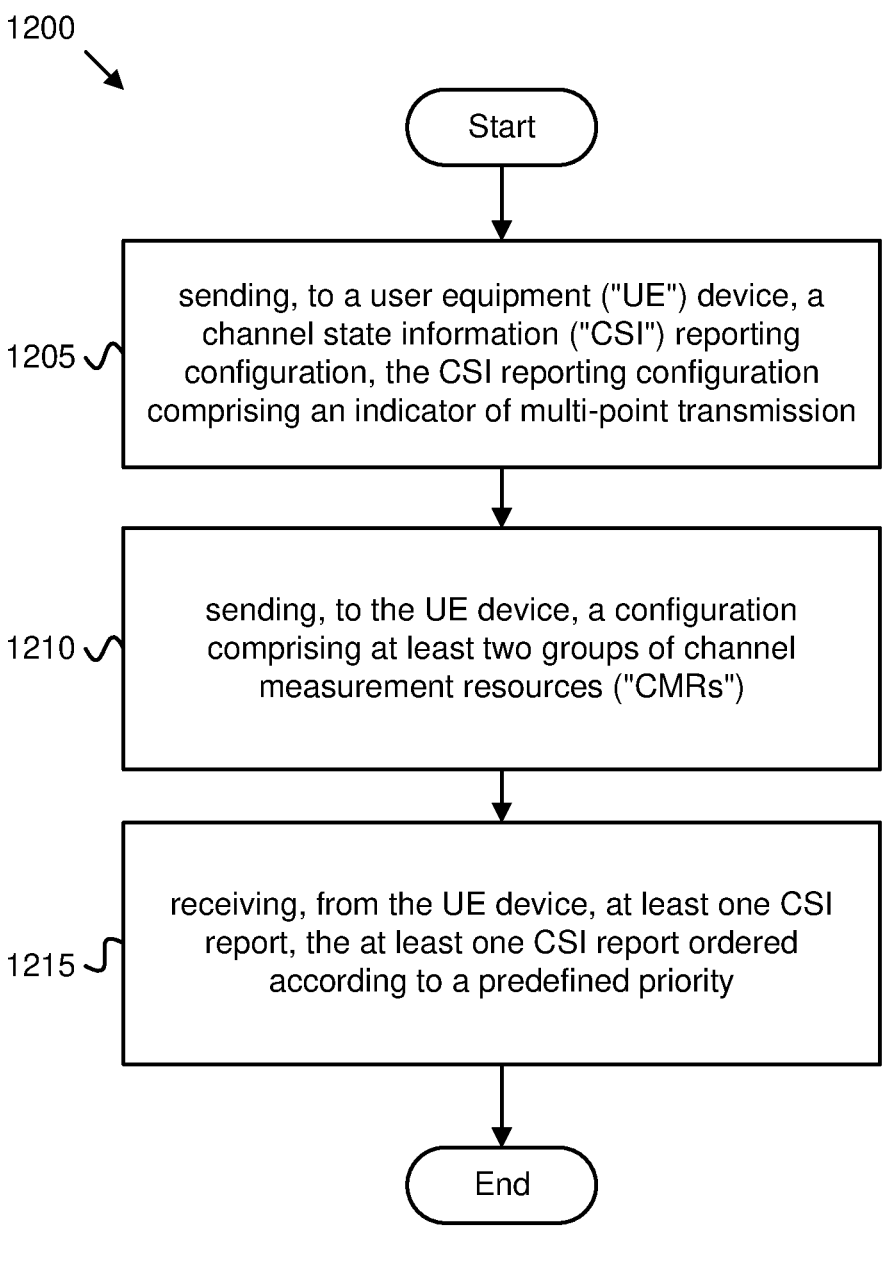

Start

1205 — sending, to a user equipment ("UE") device, a channel state information ("CSI") reporting configuration, the CSI reporting configuration comprising an indicator of multi-point transmission 1210 — sending, to the UE device, a configuration comprising at least two groups of channel measurement resources ("CMRs")

1215 — receiving, from the UE device, at least one CSI report, the at least one CSI report ordered according to a predefined priority End

FIG. 12

CHANNEL STATE INFORMATION REPORTING FOR MULTIPLE TRANSMIT/RECEIVE POINTS AND FREQUENCY DIVISION DUPLEX RECIPROCITY

CROSS-REFERENCE TO RELATED APPLICATIONS

This application claims priority to U.S. Provisional Patent Application No. 63/142,964 entitled "APPARATUSES, METHODS, AND SYSTEMS FOR CSI REPORTING ENHANCEMENTS FOR MULTI-TRP AND FDD RECIPROCITY" and filed on Jan. 28, 2021, for Ahmed Monier Ibrahim Saleh Hindy et al., which is incorporated herein by reference.

FIELD

The subject matter disclosed herein relates generally to wireless communications and more particularly relates to channel state information reporting for multiple transmit/receive points and frequency division duplex reciprocity.

BACKGROUND

In certain wireless communication systems, a User Equipment device ("UE") is able to connect with a fifth-generation ("5G") core network (i.e., "5GC") in a Public Land Mobile Network ("PLMN"). In wireless networks, channel state information may be transmitted between a UE and a wireless network.

BRIEF SUMMARY

Disclosed are procedures for channel state information reporting for multiple transmit/receive points and frequency division duplex reciprocity. Said procedures may be implemented by apparatus, systems, methods, and/or computer program products.

A first apparatus, in one embodiment, includes a transceiver that receives, from a mobile wireless communication network, a channel state information ("CSI") reporting configuration, the CSI reporting configuration comprising an indicator of multi-point transmission. In one embodiment, the transceiver receives, from the mobile wireless communication network, a configuration comprising at least two groups of channel measurement resources ("CMRs"). In one embodiment, the first apparatus includes a processor that determines at least one CSI report based on the at least two groups of CMRs, the at least one CSI report is mapped to a transmission hypothesis corresponding to one of a single-point transmission and a multi-point transmission. In one embodiment, the transceiver transmits the at least one CSI report to the mobile wireless communication network, the at least one CSI report ordered according to a predefined priority.

A first method, in one embodiment, receives, from a mobile wireless communication network, a channel state information ("CSI") reporting configuration, the CSI reporting configuration comprising an indicator of multi-point transmission. In one embodiment, the first method receives, from the mobile wireless communication network, a configuration comprising at least two groups of channel measurement resources ("CMRs"). In one embodiment, the first method determines at least one CSI report based on the at least two groups of CMRs, the at least one CSI report is mapped to a transmission hypothesis corresponding to one of a single-point transmission and a multi-point transmission. In one embodiment, the first method transmits the at least one CSI report to the mobile wireless communication network, the at least one CSI report ordered according to a predefined priority.

In one embodiment, a second apparatus includes a transceiver that sends, to a user equipment ("UE") device, a channel state information ("CSI") reporting configuration, the CSI reporting configuration comprising an indicator of multi-point transmission. In one embodiment, the transceiver sends, to the UE device, a configuration comprising at least two groups of channel measurement resources ("CMRs"). In one embodiment, the transceiver receives, from the UE device, at least one CSI report, the at least one CSI report ordered according to a predefined priority.

In one embodiment, a second method sends, to a user equipment ("UE") device, a channel state information ("CSI") reporting configuration, the CSI reporting configuration comprising an indicator of multi-point transmission. In one embodiment, the second method sends, to the UE device, a configuration comprising at least two groups of channel measurement resources ("CMRs"). In one embodiment, the second method receives, from the UE device, at least one CSI report, the at least one CSI report ordered according to a predefined priority.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a code sample illustrating one embodiment of the process by which an aperiodic trigger state indicates a resource set and QCL information for channel state information reporting for multiple transmit/receive points and frequency division duplex reciprocity;

FIG. 5 is a code sample illustrating one embodiment of an RRC configuration including an NZP-CSI-RS resource and a CSI-IM-resource for channel state information reporting for multiple transmit/receive points and frequency division duplex reciprocity;

FIG. 7A is a code sample illustrating one embodiment of CSI-ReportConfig Reporting Setting IE with multi-TRP transmission indication;

FIG. 7B is a code sample illustrating one embodiment of triggering more than one CSI Report within CSI-Report-Config Reporting Setting IE;

FIG. 7C is a code sample illustrating one embodiment of triggering two CSI Reports within CodebookConfig Codebook Configuration IE;

FIG. 7D is a code sample illustrating one embodiment of triggering two CSI Reports within CSI-ReportConfig Reporting Setting IE;

FIG. 7E is a code sample illustrating one embodiment of triggering two CSI Reports within CSI-ReportConfig Reporting Setting IE;

FIG. 8A is a code sample illustrating one embodiment of configuring a UE with a reciprocity-based codebook as part of CSI feedback reporting;

FIG. 8B is a code sample illustrating one embodiment of configuring a UE with a reciprocity-based codebook as part of CSI feedback reporting;

FIG. 8C is a code sample illustrating one embodiment of configuring a UE with a reciprocity-based codebook as part of CSI feedback reporting;

FIG. 12 is a flowchart diagram illustrating one embodiment of another method for channel state information reporting for multiple transmit/receive points and frequency division duplex reciprocity.

DETAILED DESCRIPTION

Figure 1:
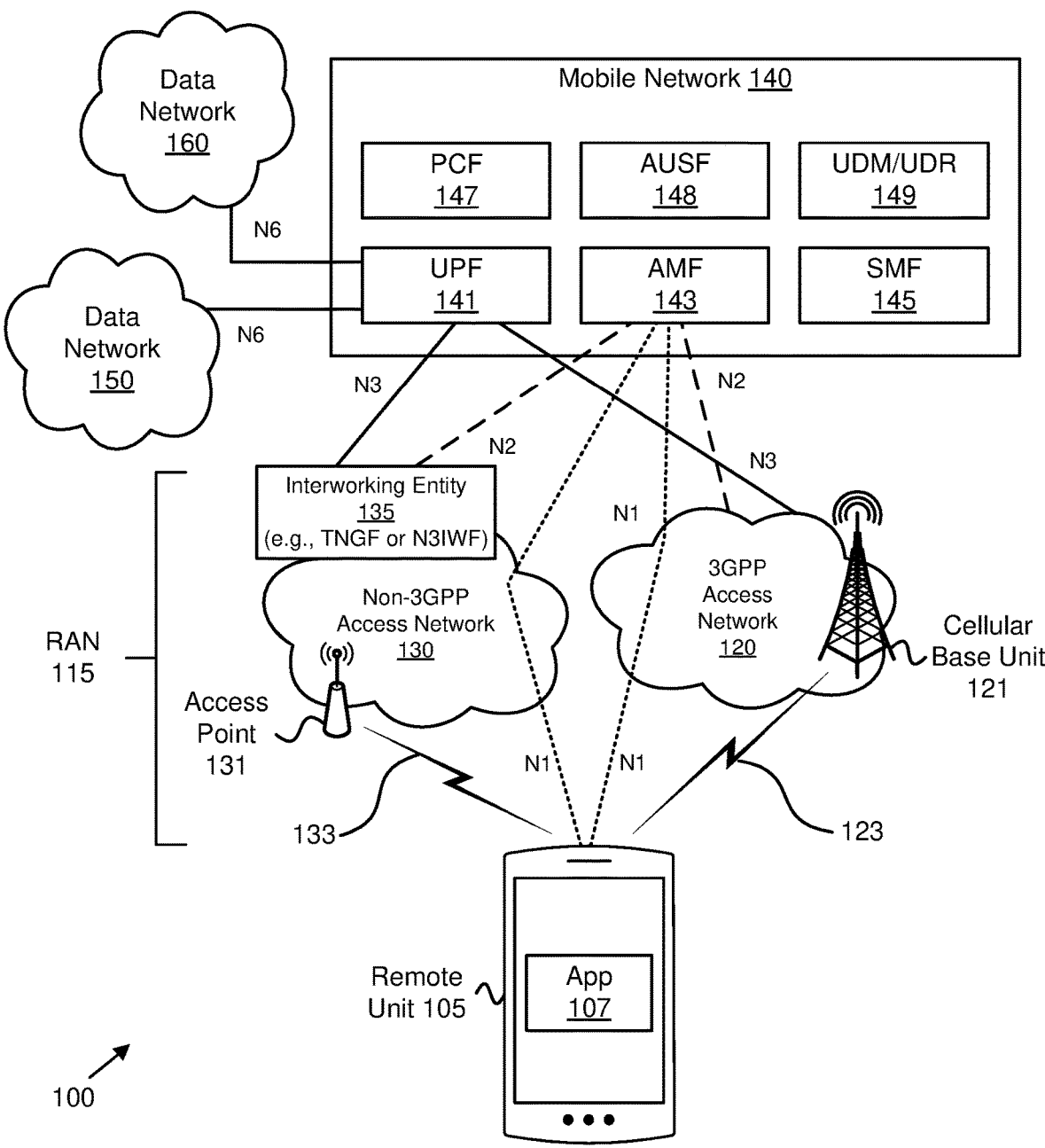
FIG. 1 is a schematic block diagram illustrating one embodiment of a wireless communication system for channel state information reporting for multiple transmit/receive points and frequency division duplex reciprocity.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for channel state information reporting for multiple transmit/receive points and frequency division duplex reciprocity. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

For 3GPP NR, multiple transmit/receive points ("TRPS") or multiple antenna panels within a TRP may communicate simultaneously with one user equipment (UE) to enhance coverage, throughput, or reliability. This may come at the expense of excessive control signaling between the network side and the UE side, so as to communicate the best transmission configuration, e.g., whether to support multipoint transmission, and if so, which TRPs would operate simultaneously, in addition to a possibly super-linear increase in the amount of channel state information ("CSI") feedback reported from the UE to the network, since a distinct report may be needed for each transmission configuration. For NR Type-II codebook with high resolution, the number of Precoding Matrix Indicator ("PMI") bits fed back from the UE in the gNB via uplink control information ("UCI") can be very large (>1000 bits at large bandwidth), even for a single-point transmission. Thereby, reducing the number of PMI feedback bits per report is crucial to improve efficiency.

In this disclosure, solutions are proposed to address different CSI reporting enhancements for multi-TRP and frequency division duplex ("FDD") reciprocity. Under multi-TRP, different embodiments of CSI priority rules are presented, as well as new channel measurement resource ("CMR") grouping for non-coherent joint transmission ("NCJT"). For FDD reciprocity, different embodiments on supported parameter combinations and codebook design are also provided. Several embodiments and examples therein are provided to explain the proposals and clarify how they can be adopted in practical scenarios.

FIG. 1 depicts a wireless communication system 100 for channel state information reporting for multiple transmit/ receive points and frequency division duplex reciprocity, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example World-wide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN")

connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (i.e., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the SGC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As discussed above, in one embodiment, for 3GPP NR, multiple transmit/receive points ("TRPS") or multiple antenna panels within a TRP may communicate simultaneously with one user equipment ("UE") to enhance coverage, throughput, or reliability. This may come at the expense of excessive control signaling between the network side and the UE side, so as to communicate the best transmission configuration, e.g., whether to support multi-point transmission, and if so, which TRPs would operate simultaneously, in addition to a possibly super-linear increase in the amount of channel state information ("CSI") feedback reported from the UE to the network, since a distinct report may be needed for each transmission configuration. For NR Type-II codebook with high resolution, the number of Precoding Matrix Indicator ("PMI") bits fed back from the UE in the gNB via uplink control information ("UCI") can be very large (>1000 bits at large bandwidth), even for a single-point transmission. Thereby, reducing the number of PMI feedback bits per report is crucial to improve efficiency.

The multiple input/multiple output ("MIMO") enhancements, in one embodiment, in NR MIMO work item included multi-TRP and multi-panel transmissions. The purpose of multi-TRP transmission, in one embodiment, is to improve the spectral efficiency, as well as the reliability and robustness of the connection in different scenarios, and it covers both ideal and nonideal backhaul.

Figure 2:
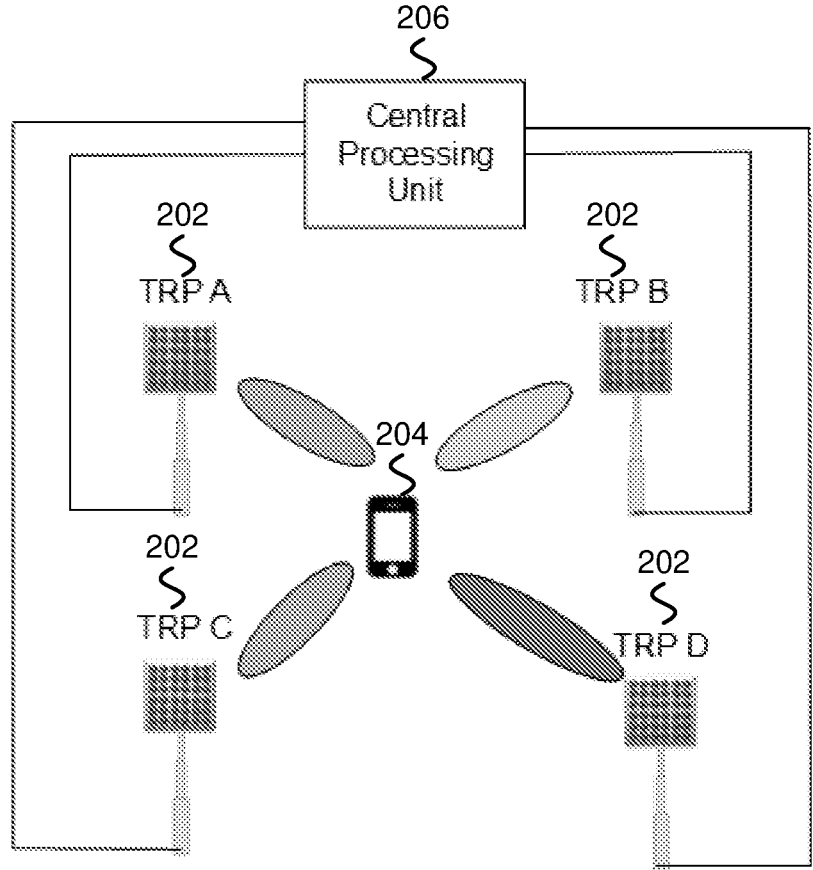
FIG. 2 is a diagram illustrating one embodiment of multiple transmit/receive points in a coordination cluster connected to a central processing unit.

For increasing the reliability using mTRP, ultra-reliable low latency communication ("URLLC") under mTRP transmission may be used, where the UE 204 can be served by multiple TRPs 202 forming a coordination cluster, possibly connected to a central processing unit, as shown in FIG. 2.

In one scenario, the UE 204 can be dynamically scheduled to be served by one of multiple TRPs 202 in the cluster (e.g., baseline Rel. 15 NR scheme). The network can also pick two TRPs 202 to perform joint transmission. In either case, the UE 204 needs to report the needed CSI information for the network for it to decide the mTRP downlink transmission scheme.

However, in one embodiment, the number of transmission hypotheses increases exponentially with number of TRPs in the coordination cluster. For example, for 4 TRPs, you have 10 transmission hypotheses: (TRP 1), (TRP 2), (TRP 3), (TRP 4), (TRP 1, TRP 2), (TRP 1, TRP 3), (TRP 1, TRP 4), (TRP 2, TRP 3), (TRP 2, TRP 4), and (TRP 3, TRP 4). The overhead from reporting will increase dramatically with the size of the coordination cluster. In general, the presence of K TRPs can trigger up $$K + \binom{K}{n},$$

to where $$\binom{K}{n}$$

represents the binomial coefficient representing the number of possible unordered n-tuples selected from a set of K elements, where $n \le K$.

Moreover, in one embodiment, the uplink ("UL") transmission resources on which the CSI reports are transmitted might not be enough, and partial CSI omission might be necessary as the case in Rel-16. Currently CSI reports are prioritized according to:

time-domain behavior and physical channel, where more dynamic reports are given precedence over less dynamic reports and physical uplink shared channel ("PUSCH") has precedence over physical uplink control channel ("PUCCH").

CSI content, where beam reports (i.e. L1-RSRP reporting) has priority over regular CSI reports.

the serving cell to which the CSI corresponds (in case of CA operation). CSI corresponding to the PCell has priority over CSI corresponding to Scells.

the reportConfigID.

The subject matter disclosed herein, in one embodiment, addresses the following issues:

For CSI enhancements under multi-TRP, new embodiments of the CSI report priority function are provided;

For CSI enhancements under multi-TRP: new embodiments on CMR grouping for single-TRP and NCJT hypotheses are provided;

For CSI enhancements under Port-Selection Codebook: new embodiments on feeding back the parameter combinations configured for the codebook are provided; and For CSI enhancements under Port-Selection Codebook: new embodiments on configuring, indicating, and reporting selected FD basis vector indices are provided.

Regarding NR Rel. 15 Type-II Codebook, in one embodiment, assume the gNB is equipped with a two-dimensional ("2D") antenna array with $N_1$, $N_2$ antenna ports per polarization placed horizontally and vertically and communication occurs over $N_3$ PMI sub-bands. A PMI subband consists of a set of resource blocks, each resource block consisting of a set of subcarriers.

In such case, $2N_1N_2$ CSI-reference signal ("RS") ports are utilized to enable DL channel estimation with high resolution for NR Type-II codebook. To reduce the UL feedback overhead, a Discrete Fourier transform ("DFT")-based CSI compression of the spatial domain is applied to L dimensions per polarization, where $L < N_1N_2$. The magnitude and phase values of the linear combination coefficients for each sub-band are fed back to the gNB as part of the CSI report. The $2N_1N_2xN_3$ codebook per layer takes on the form $$W = W_1 W_2,$$

where $W_1$ is a $2N_1N_2 \times 2L$ block-diagonal matrix ($L < N_1N_2$) with two identical diagonal blocks, i.e., $$W_1 = \begin{bmatrix} B & 0 \\ 0 & B \end{bmatrix},$$

and B is an $N_1N_2xL$ matrix with columns drawn from a 2D oversampled DFT matrix, as follows.

$$u_m = \left[ 1 \quad e^{j\frac{2\pi m}{O_2 N_2}} \quad \cdots \quad e^{j\frac{2\pi m(N_2-1)}{O_2 N_2}} \right],$$

$$v_{l,m} = \left[ u_m \quad e^{j\frac{2\pi l}{O_1 N_1}} u_m \quad \cdots \quad e^{j\frac{2\pi l(N_1-1)}{O_1 N_1}} u_m \right]^T,$$

$$B = [\, v_{l_0,m_0} \quad v_{l_1,m_1} \quad \cdots \quad v_{l_{L-1},m_{L-1}} \,],$$

$$l_i = O_1 n_1^{(i)} + q_1, \, 0 \le n_1^{(i)} < N_1, \, 0 \le q_1 < O_1 - 1,$$

$$m_i = O_2 n_2^{(i)} + q_2, \, 0 \le n_2^{(i)} < N_2, \, 0 \le q_2 < O_2 - 1,$$

where the superscript T denotes a matrix transposition operation. Note that $O_1$, $O_2$ oversampling factors are assumed for the 2D DFT matrix from which matrix B is drawn. Note that $W_1$ is common across all layers. $W_2$ is a $2L \times N_3$ matrix, where the $i^{th}$ column corresponds to the linear combination coefficients of the 2L beams in the $i^{th}$ sub-band. Only the indices of the L selected columns of B are reported, along with the oversampling index taking on $O_1 O_2$ values. Note that $W_2$ are independent for different layers.

For NR Rel. 15 Type-II Port Selection codebook, in one embodiment, only K (where $K \le 2N_1N_2$) beamformed CSI-RS ports are utilized in DL transmission, in order to reduce complexity. The $KxN_3$ codebook matrix per layer takes on the form:

$$W = W_1^{PS} W_2.$$

Here, $W_2$ follow the same structure as the conventional NR Rel. 15 Type-II Codebook and are layer specific.

$$W_1^{PS}$$

is a $Kx2L$ block-diagonal matrix with two identical diagonal blocks, i.e., $$W_1^{PS} = \begin{bmatrix} E & 0 \\ 0 & E \end{bmatrix},$$

and E is $$a\frac{K}{2} \times L$$

matrix whose columns are standard unit vectors, as follows:

$$E = \left[\, e_{mod(m_{PS}d_{PS},K/2)}^{(K/2)} \quad e_{mod(m_{PS}d_{PS}+1,K/2)}^{(K/2)} \quad \cdots \quad e_{mod(m_{PS}d_{PS}+L-1,K/2)}^{(K/2)} \,\right],$$

where $$e_i^{(K)}$$

is a standard unit vector with a 1 at the $i^{th}$ location. Here $d_{PS}$ is an RRC parameter which takes on the values $\{1, 2, 3, 4\}$ under the condition $d_{PS} \le min(K/2, L)$, whereas $m_{PS}$ takes on the values $$\left\{0, \ldots, \left\lceil \frac{K}{2d_{PS}} \right\rceil - 1\right\}$$

and is reported as part of the UL CSI feedback overhead. $W_1$ is common across all layers.

For K=16, L=4 and $d_{PS}$=1, the 8 possible realizations of E corresponding to $m_{PS}$={0,1, . . . ,7} are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix}, \begin{bmatrix} 0&0&0&0 \\ 1&0&0&0 \\ 0&1&0&0 \\ 0&0&1&0 \\ 0&0&0&1 \\ 0&0&0&0 \\ 0&0&0&0 \\ 0&0&0&0 \end{bmatrix}, \begin{bmatrix} 0&0&0&0 \\ 0&0&0&0 \\ 1&0&0&0 \\ 0&1&0&0 \\ 0&0&1&0 \\ 0&0&0&1 \\ 0&0&0&0 \\ 0&0&0&0 \end{bmatrix}, \begin{bmatrix} 0&0&0&0 \\ 0&0&0&0 \\ 0&0&0&0 \\ 1&0&0&0 \\ 0&1&0&0 \\ 0&0&1&0 \\ 0&0&0&1 \\ 0&0&0&0 \end{bmatrix}, \begin{bmatrix} 0&0&0&0 \\ 0&0&0&0 \\ 0&0&0&0 \\ 0&0&0&0 \\ 1&0&0&0 \\ 0&1&0&0 \\ 0&0&1&0 \\ 0&0&0&1 \end{bmatrix},$$

$$\begin{bmatrix} 0&0&0&1 \\ 0&0&0&0 \\ 0&0&0&0 \\ 0&0&0&0 \\ 0&0&0&0 \\ 1&0&0&0 \\ 0&1&0&0 \\ 0&0&1&0 \end{bmatrix}, \begin{bmatrix} 0&0&1&0 \\ 0&0&0&1 \\ 0&0&0&0 \\ 0&0&0&0 \\ 0&0&0&0 \\ 0&0&0&0 \\ 1&0&0&0 \\ 0&1&0&0 \end{bmatrix}, \begin{bmatrix} 0&1&0&0 \\ 0&0&1&0 \\ 0&0&0&1 \\ 0&0&0&0 \\ 0&0&0&0 \\ 0&0&0&0 \\ 0&0&0&0 \\ 1&0&0&0 \end{bmatrix}.$$

When $d_{PS}$=2, the 4 possible realizations of E corresponding to $m_{PS}$={0,1,2,3} are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix}, \begin{bmatrix} 0&0&0&0 \\ 0&0&0&0 \\ 1&0&0&0 \\ 0&1&0&0 \\ 0&0&1&0 \\ 0&0&0&1 \\ 0&0&0&0 \\ 0&0&0&0 \end{bmatrix}, \begin{bmatrix} 0&0&0&0 \\ 0&0&0&0 \\ 0&0&0&0 \\ 0&0&0&0 \\ 1&0&0&0 \\ 0&1&0&0 \\ 0&0&1&0 \\ 0&0&0&1 \end{bmatrix}, \begin{bmatrix} 0&0&1&0 \\ 0&0&0&1 \\ 0&0&0&0 \\ 0&0&0&0 \\ 0&0&0&0 \\ 0&0&0&0 \\ 1&0&0&0 \\ 0&1&0&0 \end{bmatrix}.$$

When $d_{PS}$=3, the 3 possible realizations of E corresponding of $m_{PS}$={0,1,2} are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix}, \begin{bmatrix} 0&0&0&0 \\ 0&0&0&0 \\ 0&0&0&0 \\ 1&0&0&0 \\ 0&1&0&0 \\ 0&0&1&0 \\ 0&0&0&1 \\ 0&0&0&0 \end{bmatrix}, \begin{bmatrix} 0&0&1&0 \\ 0&0&0&1 \\ 0&0&0&0 \\ 0&0&0&0 \\ 0&0&0&0 \\ 0&0&0&0 \\ 1&0&0&0 \\ 0&1&0&0 \end{bmatrix}.$$

When $d_{PS}$=4, the 2 possible realizations of E corresponding of $m_{PS}$={0,1} are as follows:

$$\begin{bmatrix} 1&0&0&0 \\ 0&1&0&0 \\ 0&0&1&0 \\ 0&0&0&1 \\ 0&0&0&0 \\ 0&0&0&0 \\ 0&0&0&0 \\ 0&0&0&0 \end{bmatrix}, \begin{bmatrix} 0&0&0&0 \\ 0&0&0&0 \\ 0&0&0&0 \\ 0&0&0&0 \\ 1&0&0&0 \\ 0&1&0&0 \\ 0&0&1&0 \\ 0&0&0&1 \end{bmatrix}.$$

To summarize, in one embodiment, $m_{PS}$ parametrizes the location of the first 1 in the first column of E, whereas $d_{PS}$ represents the row shift corresponding to different values of $M_{PS}$.

In one embodiment, NR Type-I codebook is the baseline codebook for NR, with a variety of configurations. The most common utility of Type-I codebook is a special case of NR Type-II codebook with L=1 for RI=1,2, wherein a phase coupling value is reported for each sub-band, i.e., $W_2$ is $2xN_3$, with the first row equal to [1, 1, . . . , 1] and the second row equal to $[e^{j2\pi\phi_0}, \ldots, e^{j2\pi\phi N_{3-1}}]$. Under specific configurations, $\phi_0 = \phi_1 \ldots = \phi$, i.e., wideband reporting. For RI>2 different beams are used for each pair of layers. Obviously, NR Type-I codebook can be depicted as a low-resolution version of NR Type-II codebook with spatial beam selection per layer-pair and phase combining only.

Regarding NR Rel. 161 Type-II codebook, in one embodiment, assume the gNB is equipped with a two-dimensional (2D) antenna array with $N_1$, $N_2$ antenna ports per polarization placed horizontally and vertically and communication occurs over $N_3$ PMI sub-bands. A PMI sub-band consists of a set of resource blocks, each resource block consisting of a set of subcarriers. In such case, $2N_1N_2N_3$ CSI-RS ports are utilized to enable DL channel estimation with high resolution for NR Rel. 16 Type-II codebook. To reduce the UL feedback overhead, a Discrete Fourier transform (DFT)-based CSI compression of the spatial domain is applied to L dimensions per polarization, where $L<N_1N_2$. Similarly, additional compression in the frequency domain is applied, where each beam of the frequency-domain precoding vectors is transformed using an inverse DFT matrix to the delay domain, and the magnitude and phase values of a subset of the delay-domain coefficients are selected and fed back to the gNB as part of the CSI report. The $2N_1N_2xN_3$ codebook per layer takes on the form:

$$W = W_1 \tilde{W}_2 W_f^H,$$

where $W_1$ is a $2N_1N_2x2L$ block-diagonal matrix ($L<N_1N_2$) with two identical diagonal blocks, i.e., $$W_1 = \begin{bmatrix} B & 0 \\ 0 & B \end{bmatrix},$$

and B is an $N_1N_2xL$ matrix with columns drawn from a 2D oversampled DFT matrix, as follows.

$$u_m = \left[ 1 \quad e^{j\frac{2\pi m}{O_2 N_2}} \quad \ldots \quad e^{j\frac{2\pi m(N_2-1)}{O_2 N_2}} \right],$$

$$v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T,$$

$$B = [ v_{l_0,m_0} \quad v_{l_1,m_1} \quad \cdots \quad v_{l_{L-1},m_{L-1}} ],$$

$$l_i = O_1 n_1^{(i)} + q_1, \ 0 \le n_1^{(i)} < N_1, \ 0 \le q_1 < O_1 - 1,$$

$$m_i = O_2 n_2^{(i)} + q_2, \ 0 \le n_2^{(i)} < N_2, \ 0 \le q_2 < O_2 - 1,$$

where the superscript $^T$ denotes a matrix transposition operation. Note that $O_1$, $O_2$ oversampling factors are assumed for the 2D DFT matrix from which matrix B is drawn. Note that $W_1$ is common across all layers. $W_f$ is an $N_3xM$ matrix ($M<N_3$) with columns selected from a critically sampled size-$N_3$ DFT matrix, as follows $$W_f = [\, f_{k_0} \quad f_{k_1} \quad \cdots \quad f_{k_{M_f-1}} \,], \quad 0 \le k_i < N_3 - 1,$$

$$f_k = \begin{bmatrix} 1 & e^{-j\frac{2\pi k}{N_3}} & \cdots & e^{-j\frac{2\pi k(N_3-1)}{N_3}} \end{bmatrix}^T.$$

Only the indices of the L selected columns of B are reported, along with the oversampling index taking on $O_1 O_2$ values. Similarly, for $W_F$, only the indices of the M selected columns out of the predefined size-$N_3$ DFT matrix are reported. In the sequel the indices of the M dimensions are referred as the selected Frequency Domain ("FD") basis indices. Hence, L, M represent the equivalent spatial and frequency dimensions after compression, respectively. Finally, the 2L×M matrix $\tilde{W}_2$ represents the linear combination coefficients ("LCCs") of the spatial and frequency DFT-basis vectors. Both $\tilde{W}_2$, $W_f$ are selected independent for different layers. Magnitude and phase values of an approximately β fraction of the 2LM available coefficients are reported to the gNB (β<1) as part of the CSI report. Coefficients with zero magnitude are indicated via a per-layer bitmap. Since all coefficients reported within a layer are normalized with respect to the coefficient with the largest magnitude (strongest coefficient), the relative value of that coefficient is set to unity, and no magnitude or phase information is explicitly reported for this coefficient. Only an indication of the index of the strongest coefficient per layer is reported. Hence, for a single-layer transmission, magnitude and phase values of a maximum of $\lceil 2\beta LM \rceil - 1$ coefficients (along with the indices of selected L, M DFT vectors) are reported per layer, leading to significant reduction in CSI report size, compared with reporting $2N_1N_2 \times N_3 - 1$ coefficients' information.

Regarding NR Rel. 16 Type II Port Selection Codebook, only K (where $K \le 2N_1N_2$) beamformed CSI-RS ports are utilized in DL transmission, to reduce complexity. The $K \times N_3$ codebook matrix per layer takes on the form:

$$W = W_1^{PS} \tilde{W}_2 W_f^H$$

Here, $\tilde{W}_2$ and $W_3$ follow the same structure as the conventional NR Rel. 16 Type-II Codebook, where both are layer specific. The matrix $$W_1^{PS}$$

is a Kx2L block-diagonal matrix with the same structure as that in the NR Rel. 15 Type-II Port Selection Codebook.

Regarding codebook reporting, in one embodiment, the codebook report is partitioned into two parts based on the priority of information reported. Each part is encoded separately (Part 1 has a possibly higher code rate). Below are parameters for NR Rel. 16 Type-II codebook:

Part 1: RI+CQI+Total number of coefficients
Part 2: SD basis indicator+FD basis indicator/layer+ Bitmap/layer+Coefficient Amplitude info/layer+Coefficient Phase info/layer+Strongest coefficient indicator/layer Furthermore, in one embodiment, Part 2 CSI can be decomposed into sub-parts each with different priority (higher priority information listed first). Such partitioning is required to allow dynamic reporting size for codebook based on available resources in the uplink phase.

Also Type-II codebook, in one embodiment, is based on aperiodic CSI reporting, and only reported in PUSCH via DCI triggering (one exception). Type-I codebook can be based on periodic CSI reporting (PUCCH) or semi-persistent CSI reporting (PUSCH or PUCCH) or aperiodic reporting (PUSCH).

Regarding priority reporting for part 2 CSI, in one embodiment, multiple CSI reports may be transmitted, as shown in Table 1 below:

TABLE 1

| CSI Reports priority ordering |
| --- |
| Priority 0:<br>For CSI reports 1 to $N_{Rep}$, Group 0 CSI for CSI reports configured as 'typeII-r16' or 'typeII-PortSelection-r16'; Part 2 wideband CSI for CSI reports configured otherwise |
| Priority 1:<br>Group 1 CSI for CSI report 1, if configured as 'typeII-r16' or 'typeII-PortSelection-r16'; Part 2 subband CSI of even subbands for CSI report 1, if configured otherwise |
| Priority 2:<br>Group 2 CSI for CSI report 1, if configured as 'typeII-r16' or 'typeII-PortSelection-r16'; Part 2 subband CSI of odd subbands for CSI report 1, if configured otherwise |
| Priority 3:<br>Group 1 CSI for CSI report 2, if configured as 'typeII-r16' or 'typeII-PortSelection-r16'; Part 2 subband CSI of even subbands for CSI report 2, if configured otherwise |
| Priority 4:<br>Group 2 CSI for CSI report 2, if configured as 'typeII-r16' or 'typeII-PortSelection-r16'. Part 2 subband CSI of odd subbands for CSI report 2, if configured otherwise |
| .<br>.<br>. |
| Priority $2N_{Rep} - 1$:<br>Group 1 CSI for CSI report $N_{Rep}$, if configured as 'typeII-r16' or 'typeII-PortSelection-r16'; Part 2 subband CSI of even subbands for CSI report $N_{Rep}$, if configured otherwise |
| Priority $2N_{Rep}$:<br>Group 2 CSI for CSI report $N_{Rep}$, if configured as 'typeII-r16' or 'typeII-PortSelection-r16'; Part 2 subband CSI of odd subbands for CSI report $N_{Rep}$, if configured otherwise |

Note that the priority of the NRep CSI reports are based on the following:

A CSI report corresponding to one CSI reporting configuration for one cell may have higher priority compared with another CSI report corresponding to one other CSI reporting configuration for the same cell;

CSI reports intended to one cell may have higher priority compared with other CSI reports intended to another cell;

CSI reports may have higher priority based on the CSI report content, e.g., CSI reports carrying L1-RSRP information have higher priority; and CSI reports may have higher priority based on their type, e.g., whether the CSI report is aperiodic, semi-persistent or periodic, and whether the report is sent via PUSCH or PUCCH, may impact the priority of the CSI report.

In light of that, CSI reports may be prioritized as follows, where CSI reports with lower IDs have higher priority $$Pri_{iCSI}(y, k, c, s) = 2 \cdot N_{cells} \cdot M_s \cdot y + N_{cells} \cdot M_s \cdot k + M_s \cdot c + s$$

s: CSI reporting configuration index, and $M_S$: Maximum number of CSI reporting configurations c: Cell index, and $N_{cells}$: Number of serving cells k: 0 for CSI reports carrying L1-RSRP or L1-SINR, 1 otherwise y: 0 for aperiodic reports, 1 for semi-persistent reports on PUSCH, 2 for semi-persistent reports on PUCCH, 3 for periodic reports.

Regarding triggering aperiodic CSI reporting on PUSCH, in one embodiment, for multi-TRP URLLC transmission, five schemes have been agreed in Rel. 16:

Scheme 1a (subscriber data management ("SDM")): two TRPs transmit a physical downlink shared channel ("PDSCH") with overlapped time and frequency resource within a single slot;

Scheme 2a (frequency division multiplexing ("FDM")): two TRPs transmit a PDSCH with one redundancy version ("RV") across non-overlapping comb-like frequency resources assigned to different TRPs within a single slot;

Scheme 2b (FDM): two TRPs transmit a PDSCH with different RVs across non-overlapping comb-like frequency resources assigned to different TRPs within a single slot;

Scheme 3 (time division multiplexing ("TDM")): two TRPs transmit up to 2 TDMed PDSCH transmission occasions within a single slot; and Scheme 4 (TDM): two TRPs transmit PDSCH transmission occasions across K different slots alternatively.

In one embodiment, the UE needs to report the needed CSI information for the network using the CSI framework in NR Rel 15. The triggering mechanism between a report setting and a resource setting can be summarized in Table 2 below:

TABLE 2

| Triggering mechanism between a report setting and a resource setting | | | |
| --- | --- | --- | --- |
| | Periodic CSI reporting | SP CSI reporting | AP CSI Reporting |
| Time Domain Behavior of | Periodic CSI-RS SP | RRC configured Not | MAC CE (PUCCH) DCI (PUSCH) MAC CE (PUCCH) | DCI |

TABLE 2-continued

| Triggering mechanism between a report setting and a resource setting | | | |
| --- | --- | --- | --- |
| | Periodic CSI reporting | SP CSI reporting | AP CSI Reporting |
| Resource Setting | CSI-RS Supported AP Not CSI-RS Supported | DCI (PUSCH) Not Supported | DCI |

Moreover, in some embodiments,

All associated Resource Settings for a CSI Report Setting need to have same time domain behavior;

Periodic CSI-RS/IM resource and CSI reports are always assumed to be present and active once configured by RRC;

Aperiodic and semi-persistent CSI-RS/IM resources and CSI reports needs to be explicitly triggered or activated;

Aperiodic CSI-RS/IM resources and aperiodic CSI reports, the triggering is done jointly by transmitting a DCI Format 0-1; and Semi-persistent CSI-RS/IM resources and semi-persistent CSI reports are independently activated.

For multi-TRP URLLC, in one embodiment, aperiodic CSI reporting is likely to be triggered to inform the network about the channel conditions for every transmission hypothesis, since using periodic CSI-RS for the TRPs in the coordination cluster constitutes a large overhead. As mentioned earlier, for aperiodic CSI-RS/IM resources and aperiodic CSI reports, the triggering is done jointly by transmitting a DCI Format 0-1. The DCI Format 0_1 contains a CSI request field (0 to 6 bits). A non-zero request field points to a so-called aperiodic trigger state configured by remote resource control ("RRC"), as shown in FIG. 3.

Figure 3:
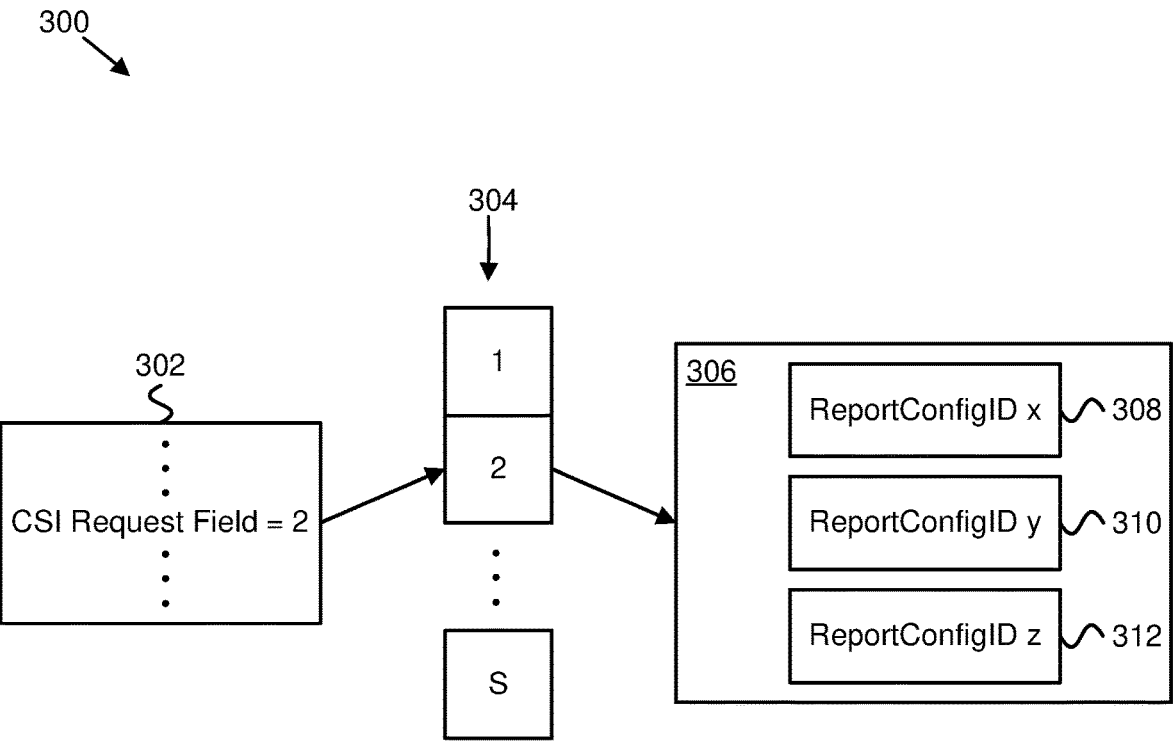
FIG. 3 is a diagram illustrating one embodiment of aperiodic trigger state defining a list of channel state information report settings for channel state information reporting for multiple transmit/receive points and frequency division duplex reciprocity.

FIG. 3 is a diagram 300 illustrating one embodiment of an aperiodic trigger state defining a list of CSI report settings. Specifically, the diagram 300 includes a DCI format 0_1 302, a CSI request codepoint 304, and an aperiodic trigger state 2 306. Moreover, the aperiodic trigger state 2 includes a ReportConfigID x 308, a ReportConfigID y 310, and a ReportConfigID z 312. An aperiodic trigger state in turn is defined as a list of up to 16 aperiodic CSI Report Settings, identified by a CSI Report Setting ID for which the UE calculates simultaneously CSI and transmits it on the scheduled PUSCH transmission.

In one embodiment, if the CSI report setting is linked with aperiodic resource setting (e.g., may include multiple resource sets), the aperiodic non-zero power ("NZP") CSI reference signal ("CSI-RS") resource set for channel measurement, the aperiodic CSI-IM resource set (if used) and the aperiodic NZP CSI-RS resource set for interference management ("IM") (if used) to use for a given CSI report setting are also included in the aperiodic trigger state definition, as shown in FIG. 4. For aperiodic NZP CSI-RS, quasi-co-location ("QCL") source may be configured in the aperiodic trigger state. The UE may assume that the resources used for the computation of the channel and interference can be processed with the same spatial filter e.g., quasi-co-located with respect to "QCL-TypeD."

FIG. 4 is a code sample 400 illustrating one embodiment of the process by which an aperiodic trigger state indicates a resource set and QCL information 402.

FIG. 5 is a code sample 500 illustrating one embodiment of an RRC configuration including a non-zero power channel state information reference signal ("NZP-CSI-RS") resource 502 and a CSI-IM-resource 504.

Table 3 shows the type of uplink channels used for CSI reporting as a function of the CSI codebook type:

TABLE 3

| Uplink channels used for CSI reporting as a function of the CSI codebook type | | | |
| --- | --- | --- | --- |
| | Periodic CSI reporting | SP CSI reporting | AP CSI reporting |
| Type I WB | PUCCH Format 2, 3, 4 | PUCCH Format 2 PUSCH | PUSCH |
| Type I SB | | PUCCH Format 3, 4 PUSCH | PUSCH |
| Type II WB | | PUCCH Format 3, 4 PUSCH | PUSCH |
| Type II SB | | PUSCH | PUSCH |
| Type II Part 1 only | | PUCCH Format 3, 4 | |

For aperiodic CSI reporting, in one embodiment, PUSCH-based reports are divided into two CSI parts: CSI Part 1 and CSI Part 2. The reason for this is that the size of CSI payload varies significantly, and therefore a worst-case UCI payload size design would result in large overhead.

In one embodiment, CSI Part 1 has a fixed payload size (and can be decoded by the gNB without prior information) and contains the following:

Rank indicator ("RI") (if reported), CSI-RS resource index ("CRI") (if reported), and channel quality indicator ("CQI") for the first codeword, number of non-zero wideband amplitude coefficients per layer for Type II CSI feedback on PUSCH.

In one embodiment, CSI Part 2 has a variable payload size that can be derived from the CSI parameters in CSI Part 1 and contains PMI and the CQI for the second codeword when RI>4.

Figure 6:
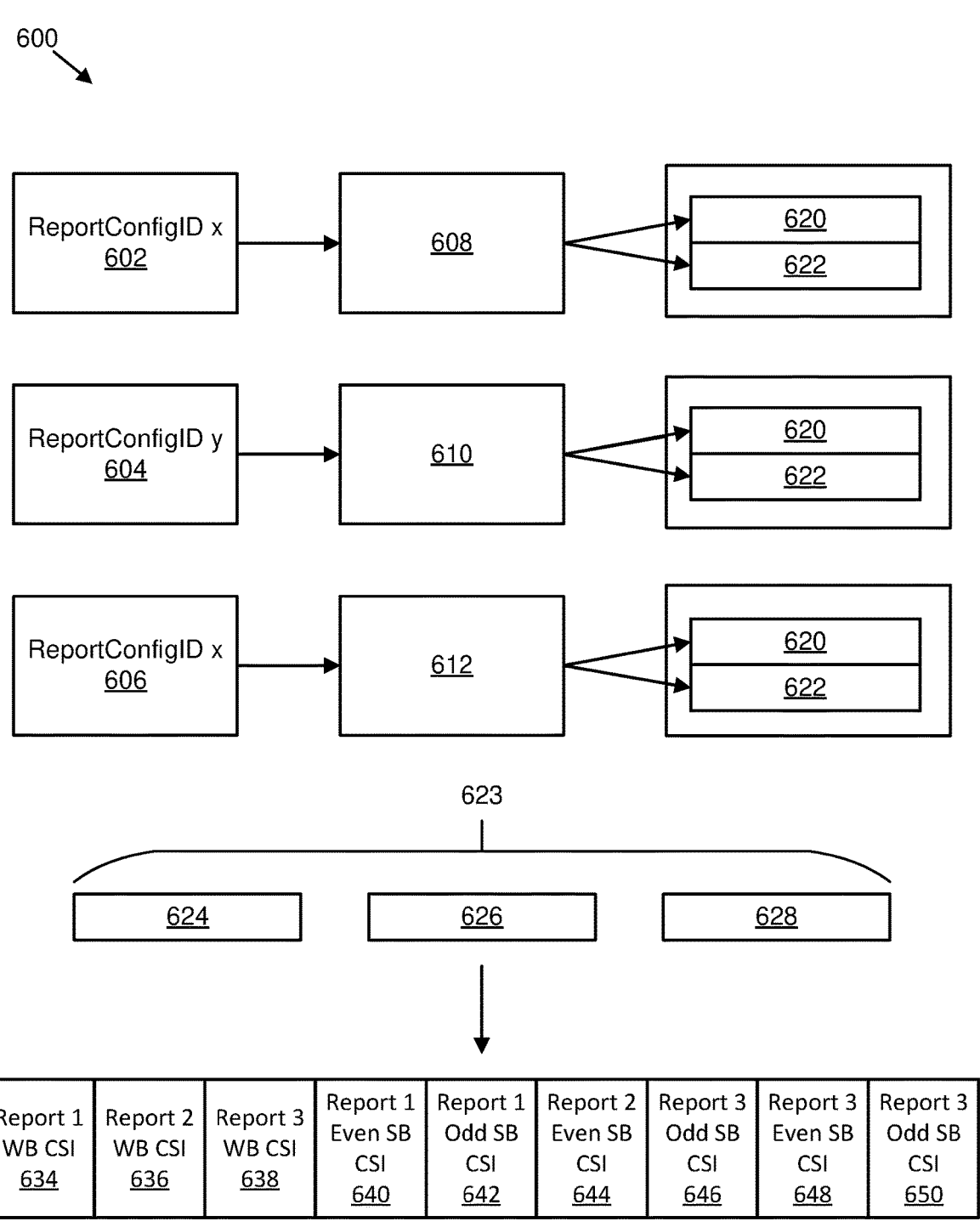
FIG. 6 is a schematic block diagram illustrating one embodiment of a partial channel state information omission for PUSCH-based channel state information for channel state information reporting for multiple transmit/receive points and frequency division duplex reciprocity.

For example, if the aperiodic trigger state indicated by DCI format 0_1 defines 3 report settings x, y, and z, then the aperiodic CSI reporting for CSI part 2 will be ordered as indicated in FIG. 6.

FIG. 6 is a schematic block diagram 600 illustrating one embodiment of a partial CSI omission for PUSCH-based CSI. The diagram 600 includes a ReportConfigID x 602, a ReportConfigID y 604, and a ReportConfigID z 606. Moreover, the diagram 600 includes a first report 608 (e.g., requested quantities to be reported) corresponding to the ReportConfigID x 602, a second report 610 (e.g., requested quantities to be reported) corresponding to the ReportConfigID y 604, and a third report 612 (e.g., requested quantities to be reported) corresponding to the ReportConfigID z 606. Each of the first report 608, the second report 610, and the third report 612 includes a CSI part 1 620, and a CSI part 2 622. An ordering 623 of CSI part 2 across reports is CSI part 2 of the first report 624, CSI part 2 of the second report 626, and CSI part 2 of the third report 628. Moreover, the CSI part 2 reports may produce a report 1 WB CSI 634, a report 2 WB CSI 636, a report 3 WB CSI 638, a report 1 even SB CSI 640, a report 1 odd SB CSI 642, a report 2 even SB CSI 644, a report 2 odd SB CSI 646, a report 3 even SB CSI 648, and a report 3 odd SB CSI 650.

In various embodiments, CSI reports may be prioritized according to:

time-domain behavior and physical channel where more dynamic reports are given precedence over less dynamic reports and PUSCH has precedence over PUCCH;

CSI content where beam reports (e.g., L1-RSRP reporting) have priority over regular CSI reports;

a serving cell to which a CSI corresponds (e.g., for CA operation)—CSI corresponding to a PCell has priority over CSI corresponding to Scells; and/or a report configuration identifier (e.g., reportConfigID).

In some embodiments, the ordering may not consider that some multi-TRP NCJT transmission hypothesis, as measured by the UE, may achieve low spectral efficiency performance and may be given a lower priority.

Regarding UCI bit sequence generation, in one embodiment, the RI, if reported, has bitwidth of $\min(\lceil \log_2 N_{ports} \rceil, \lceil \log_2 n_{RI} \rceil)$, where $N_{ports}$, $n_{RI}$ represent the number of antenna ports and the number of allowed rank indicator values, respectively. On the other hand, the CSI-RS Resource Indicator ("CRI") and the Synchronization Signal Block Resource Indicator ("SSBRI") each have bitwidths of $$\lceil \log_2 K_s^{CSI-RS} \rceil, \lceil \log_2 K_s^{SSB} \rceil,$$

respectively, where $$K_s^{CSI-RS}$$

is the number of CSI-RS resources in the corresponding resource set, and $$K_s^{SSB}$$

is the configured number of SS/PBCH blocks in the corresponding resource set for reporting 'ssb-Index-RSRP'. The mapping order of CSI fields of one CSI report with wideband PMI and wideband CQI on PUCCH is depicted in Table 4, is as follows:

TABLE 4

| Mapping order of CSI fields of one CSI report with wideband PMI and CQI on PUCCH | |
| --- | --- |
| CSI report number | CSI fields |
| CSI report #n | CRI, if reported |
| | Rank Indicator, if reported |
| | Layer Indicator, if reported |
| | Zero padding bits, if needed |
| | PMI wideband information fields, if reported |
| | PMI wideband information, if reported |
| | Wideband CQI for the first Transport Block, if reported |
| | Wideband CQI for the second Transport Block, if reported |

Several embodiments of the proposed solution are described below. According to a possible embodiment, one or more elements or features from one or more of the described embodiments may be combined, e.g., for CSI measurement, feedback generation and/or reporting which may reduce the overall CSI feedback overhead.

In one embodiment, there are a number of assumptions related to the problem to be solved, which may include:

For ease of exposition, hereafter we use the notion of a "TRP" in a general fashion to include at least one of TRPs, nodes, panels, communication (e.g., signals/ channels) associated with a control resource set ("CORESET") pool, communication associated with a transmission configuration indicator ("TCI") state from a transmission configuration comprising at least two TCI states.

The codebook type used is arbitrary; flexibility for use different codebook types (Type-I and Type-II codebooks), unless otherwise stated.

Either a single DCI or multiple DCI that trigger the UE are assumed, wherein the mTRP scheme is based on SDM (scheme 1a), FDM (schemes 2a/2b), and TDM (schemes 3/4), as specified above. Other transmission schemes are not precluded.

In one embodiment, a UE is configured by higher layers with one or more CSI-ReportConfig Reporting Settings for CSI reporting, one or more CSI-ResourceConfig Resource Settings for CSI measurement, and one or two list(s) of trigger states (given by the higher layer parameters CSI-AperiodicTriggerStateList and CSI-SemiPersistentOn-PUSCH-TriggerStateList). Each trigger state in CSI-AperiodicTriggerStateList, in one embodiment, may contain a list of a subset of the associated CSI-ReportConfigs indicating the Resource Set IDs for channel and optionally for interference. Each trigger state in CSI-SemiPersistentOn-PUSCH-TriggerStateList may contain one or more associated CSI-ReportConfig.

In a first embodiment, multi-TRP transmission may be indicated to the UE via the TCI value. In one example, two TCI states are indicated in the triggering DCI. In another example, one TCI codepoint is indicated in the triggering DCI, wherein the TCI codepoint corresponds to two TCI states.

In a second embodiment, multi-TRP transmission may be indicated to the UE via introducing a higher-layer parameter, e.g., mTRP-CSI-Enabled 702, in the CSI-ReportConfig Reporting Setting. An example of the ASN.1 code that corresponds to the CSI-ReportConfig Reporting Setting IE is provided in FIG. 7A, with a higher-layer parameter that triggers joint TRP transmission.

In a third embodiment, multi-TRP transmission may be indicated to the UE via introducing a higher-layer parameter which triggers the UE to report a given number of CSI Reports, e.g., numberOfReports, in the CSI-ReportConfig Reporting Setting or any of its elements, e.g., codebookConfig. Examples of the ASN.1 code the correspond to the CSI-ReportConfig Reporting Setting IE are provided in FIGS. 7B and 7C, where the number of CSI Reports is triggered within the Reporting Setting 704 or the codebook configuration 706, 708, respectively.

In a fourth embodiment, multi-TRP transmission may be indicated to the UE via triggering two CodebookConfig codebook configurations within one Reporting Setting, each corresponding to one or more CSI Reports. An example of the ASN.1 code the corresponds to the CSI-ReportConfig Reporting Setting IE is provided in FIG. 7D, wherein two codebook configurations 710, 712 are triggered under the same Reporting Setting.

In a fifth embodiment, multi-TRP transmission may be indicated to the UE via triggering two reportQuantity Report Quantities 714, 716 within one Reporting Setting, each corresponding to one or more CSI Reports. An example of the ASN.1 code that corresponds to the CSI-ReportConfig Reporting Setting IE is provided in FIG. 7E.

In a sixth embodiment, multi-TRP transmission may be indicated to the UE if it is not indicated with a DCI that DCI field 'Time domain resource assignment' indicating an entry which contains repetitionNumber-r16 in PDSCH-TimeDomainResourceAllocation-r16, and it is indicated with two TCI states in a codepoint of the DCI field 'Transmission Configuration Indication' and DM-RS port(s) within two CDM groups in the DCI field "Antenna Port(s)", the UE may expect to receive a single PDSCH where the association between the DM-RS ports and the TCI states are as defined in Clause 5.1.6.2 of (3GPP TS 38.214, March 2020).

Regarding CSI report priority rules, in a first embodiment, the CSI report priority rule provided in (3GPP TS 38.214, March 2020), Clause 5.2.5 is modified as follows:

$$Pri_{iCSI}(y, k, c, s, r) =$$
$$2 \cdot N_{cells} \cdot M_s \cdot N_r \cdot y + N_{cells} \cdot M_s \cdot N_r \cdot k + M_s \cdot N_r \cdot c + N_r \cdot s + r$$

where $N_r$ is equal to 2. In one example, r=0 for a CSI report with a single PMI quantity, and r=1 for a CSI report with two or more PMI quantities.

In a second embodiment, the CSI report priority rule provided in (3GPP TS 38.214, March 2020), Clause 5.2.5 is modified as follows:

$$Pri_{iCSI}(y, k, c, s, r) =$$
$$2 \cdot N_{cells} \cdot M_s \cdot N_r \cdot y + N_{cells} \cdot M_s \cdot N_r \cdot k + M_s \cdot N_r \cdot c + N_r \cdot s + r$$

Where $N_r$ is equal to 3. In one example, r=0 for a CSI report with a single PMI associated with the first CMR in a corresponding CSI Reporting Setting CSI-ReportConfig, and r=1 for a CSI report with a single PMI associated with the second CMR in a corresponding CSI Reporting Setting CSI-ReportConfig (if applicable), and r=2 fora CSI report with 2 PMI associated configured in a corresponding CSI Reporting Setting CSI-ReportConfig. In a third embodiment, the CSI report priority rule provided in (3GPP TS 38.214, March 2020), Clause 5.2.5 is modified as follows:

$$Pri_{iCSI}(y, k, c, s, r, g) =$$
$$2 \cdot N_{cells} \cdot M_s \cdot N_r \cdot N_g \cdot y +$$
$$N_{cells} \cdot M_s \cdot N_r \cdot N_g \cdot k + M_s \cdot N_r \cdot N_g \cdot c + N_r \cdot N_g \cdot s + N_g \cdot r + g$$

Where $N_g$ is equal to 2. In one example, g=0 for a CSI report with a single PMI associated with the first CMR in a corresponding CSI Reporting Setting CSI-ReportConfig, and g=1 for a CSI report with a single PMI associated with the second CMR in a corresponding CSI Reporting Setting CSI-ReportConfig (if applicable), and where $N_r$ is equal to 2, wherein r=0 for a CSI report with a single PMI, and r=1 for a CSI report with two or more PMI.

In a fourth embodiment, the CSI report priority rule provided in (3GPP TS 38.214, March 2020), Clause 5.2.5 is modified as follows:

$$Pri_{iCSI}(y, k, c, s, r, g) = 2 \cdot N_{cells} \cdot M_s \cdot N_r \cdot N_g \cdot y +$$
$$N_{cells} \cdot M_s \cdot N_r \cdot N_g \cdot k + M_s \cdot N_r \cdot N_g \cdot c + N_r \cdot N_g \cdot s + N_g \cdot r + g$$

Where $N_g$ is equal to 2. In one example, g=0 for a CSI report with a single PMI associated with the CMR with the lower ID in a corresponding CSI Reporting Setting CSI-ReportConfig, and g=1 for a CSI report with a single PMI associated with the CMR with the higher ID in a corresponding CSI Reporting Setting CSI-ReportConfig (if applicable), and where $N_r$ is equal to 2, wherein r=0 for a CSI report with a single PMI, and r=1 for a CSI report with two or more PMI.

Regarding configuring one or more CMR groups in one or more CSI Resource Settings, for multi-TRP transmission, a UE may be configured with a set of two or more CMRs in one or more CSI Resource Settings CSI-ResourceConfig, which in turn may be triggered within one or more CSI Report Settings CSI-ReportConfig for multi-TRP transmission. Two CMRs may correspond to two TRPs in an NCJT hypothesis under multi-TRP transmission. Different embodiments on the configuration of the set of two or more CMRs are provided below. Note that a combination of one or more embodiments is not precluded.

In a first embodiment, the set of two or more CMRs includes $K+N_1+N_2$ CMRs with $N_1 \geq 1$, $N_2 \geq 1$, wherein the set of CMRs are grouped for NCJT transmission into two groups with size $N_1$, $N_2$, respectively. NCJT hypothesis may correspond to two CMRs, with one CMR from each of the two CMR groups. Note that it is possible that $N_1=N_2$, where pairing between the CMRs for NCJT hypothesis may be one-to-one. The K CMRs would then correspond to single-TRP transmission.

In a second embodiment, two CMR groups with $K_1$, $K_2$ CMRs each are configured, and wherein a subset of CMRs of sizes $N_1$, $N_2$ CMRs belong to the first and second CMR groups, respectively, wherein $K_1 \geq N_1$, and $K_2 \geq N_2$. NCJT hypothesis may correspond to two CMRs, where the first and second CMRs belong to the two sets of $K_1$, $K_2$ CMRs, respectively. Note that it is possible that $K_1=K_2$, where pairing between the CMRs for NCJT hypothesis may be one-to-one.

In a third embodiment, two CMR groups with $K_1$, $K_2$ CMRs each are configured, and wherein a subset of CMRs of sizes $N_1$, $N_2$ CMRs belong to the first and second CMR groups, respectively, wherein $K_1 \geq N_1$, and $K_2 \geq N_2$. NCJT hypothesis may correspond to two CMRs, where the first and second CMRs belong to the two subsets of $N_1$, $N_2$ CMRs, respectively. Note that it is possible that $N_1=N_2$, where pairing between the CMRs for NCJT hypothesis may be one-to-one.

The following describes solutions for NR Type-II port selection enhancements. In general, a UE is configured by higher layers with one or more CSI-ReportConfig Reporting Settings, wherein each Reporting Setting may configure at least one CodebookConfig Codebook Configuration or one reportQuantity Reporting Quantity, or both, for CSI Reporting. Each Codebook Configuration represents at least one codebookType Codebook type, which includes indicators representing at least one or more of a CSI-RS Resource Indicator ("CRI"), a Synchronization-Signal Block Resource Indicator ("SSBRI"), a Rank Indicator ("RI"), a Precoding Matrix Indicator ("PMI"), a Channel Quality Indicator ("CQI"), a Layer Indicator ("L1"), a Layer-1 Reference Signal Received Power ("L1-RSRP") and a Layer-1 Signal-to-Interference-plus-Noise Ratio ("L1-SINR"). Several embodiments are described below.

According to a possible embodiment, one or more elements or features from one or more of the described embodiments may be combined.

Hereafter, a CSI report may include information for one or more layers, wherein the number of layers is up to the RI, if reported.

In general, the network would configure a UE with a reciprocity-based codebook as part of CSI feedback reporting, via a combination of one or more or the following indications:

a. Introducing one or more additional values to the higher-layer parameter CodebookType. In one embodiment, the parameter CodebookType may be part of one or more Codebook Configuration Information Elements ("IE") that were introduced in Rel. 15 and Rel. 16 e.g., CodebookConfig, or CodebookConfig-r16, respectively. In another embodiment, a new Codebook Configuration is introduced in Rel. 17, e.g., CodebookConfi g-r17. All the Codebook Configuration IEs are part of the CSI-ReportConfig Reporting Setting IE. Examples of the additional values of the Codebook-Type parameter are 'typeII-PortSelection-r17', or 'typeII-Reciprocity'. An example of the ASN.1 code that corresponds to the latter embodiment, CodebookConfig-r17 802, is provided in FIG. 8A for the Codebook Configuration IE.

b. Introducing an additional higher layer parameter, e.g., channelReciprocity, within the CSI-ReportConfig Reporting Setting IE that configures the UE with CSI feedback reporting based on channel reciprocity. The Channel Reciprocity parameter may appear in different sub-elements of the Reporting Setting IE. An Example of the ASN.1 code that corresponds to this embodiment e.g., channelReciprocity 804, is provided in FIG. 8B for the CSI-ReportConfig Reporting Setting IE.

c. Introducing an additional higher layer parameter, e.g., channelReciprocity, within the Codebook Configuration CodebookConfig IE. In one embodiment, the new parameter is under the Codebook Configuration IE, e.g., CodebookConfig, CodebookConfig-r16. In another embodiment, the new parameter is under a new configuration such as CodebookConfig-r17. In yet another embodiment, the new parameter is a sub-parameter within the higher-layer parameter codebook-Type, whenever the Codebook Type is set to 'typeII-PortSelection', 'typeII-PortSelection-r16' or another Type-II Port Selection Codebook, e.g., 'typeII-PortSe-lection-r17'. An Example of the ASN.1 code that corresponds to the last embodiment, e.g., codebook-Type 806, is provided in FIG. 8C for the Code-bookConfig Codebook Configuration IE.

Different embodiments for the configuration of parameter combinations in port-selection codebook are provided below. Note that a combination of one or more embodiments is not precluded.

In a first embodiment, a UE configured with NR Rel. 17 (and beyond) Type-II Port Selection Codebook is higher-layer configured (possibly based on RRC configuration) with one or more of the following parameters:

a. A number of beams, e.g., L;

b. A number of CSI-RS Ports, e.g., $P_{CSI-RS}$;

c. A number of PMI sub-bands per CQI sub-band, e.g., R;

d. One or more indicators that are functions of a number (or maximum numbers) of non-zero coefficients reported per layer l, e.g., $K_l$;

e. An indicator that is a function of a total (or a maximum) number of non-zero coefficients reported across all layers, e.g., $K_{tot}$;

f. One or more indicators that are functions of the number selected FD basis vectors per layer, e.g., $M_l$; and/or g. An indicator that is a function of the number selected FD basis vectors that is common for all layers, e.g., M.

In a second embodiment, either the fourth or fifth parameters in the first embodiment may be configured. In a third embodiment, either the sixth or seventh parameters in the first embodiment may be configured. In a fourth embodiment, the parameters in Embodiment 1 are jointly configured into a set of one or more parameter combinations, wherein the one or more parameter combinations are indexed with values $1,2, \ldots, N_{comb}$, wherein $N_{comb} > 1$ represents the size of the set of one or more parameter combinations. In one example. $N_{comb} = 4$. In a fifth embodiment, a subset of the set of one or more parameter combinations are configured as optional UE capabilities. In one example, parameter combinations configured with a value $M_l$ that is greater than one are marked as optional UE capabilities.

Different embodiments for feedback parameters in port-selection codebook are provided below. Note that a combination of one or more embodiments is not precluded.

In a first embodiment, a strongest coefficient indicator is reported as part of CSI feedback for each layer l, e.g., $d_l$. In a first example, $d_l$ takes on values from $0, \ldots, 2L-1$, where L is the number of beams. In a second example, $d_l$ takes on values from $0, \ldots, 4L-1$. In a third example, the strongest coefficient indicator is dubbed strongest beam per layer.

In a second embodiment, an indication of one or more selected FD basis vector indices are reported for each layer l, e.g., $i_{2,l}$, wherein the number of FD basis vectors is $M_l$ (as described in the previous section). In one example, $i_{2,l}$ is a combinatorial indicator that indicates the $M_l$ selected FD basis vector indices.

In a third embodiment, the indications of the one or more selected FD basis vector indices reported for each layer in the second embodiment are selected from a set whose size is the number of PMI sub-bands.

In a fourth embodiment, the indications of the one or more selected FD basis vector indices reported for each layer in the second embodiment are selected from a layer-common set W including one or more PMI sub-bands.

In a fifth embodiment, the set W given in the fourth embodiment is characterized by one or more of a location index, e.g., $W_{initial}$, and a set size, e.g., $W_{size}$. In a first example, $W_{size} = R$, wherein R represents the number of PMI sub-bands per CQI sub-band. In a second example, $W_{size} = 2 \cdot \max(M_l)$, where $M_l$ is the number of selected FD basis vectors for a layer l, and $\max(M_l)$ indicates the maximum value of $M_l$ across all layers $l = 1, \ldots$, RI.

In a sixth embodiment, the layer-specific indicators above are reported for layer groups. In one example, indicators of the first layer and second layer (if applicable) are the same and are reported in the form of a first value, and indicators of layers subsequent to the second layer (if applicable) are the same and reported in the form of a second value.

In some embodiments, the terms antenna, panel, and antenna panel are used interchangeably. An antenna panel may be a hardware that is used for transmitting and/or receiving radio signals at frequencies lower than 6 GHz, e.g., FR1, or higher than 6 GHz, e.g., FR2 or mmWave. In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device (e.g., UE, node) antenna panel may be a physical or logical antenna array comprising a set of antenna elements or antenna ports that share a common or a significant portion of an RF chain (e.g., in-phase/quadrature ("I/Q") modulator, analog to digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping. A Device may report its capability with respect to the "device panel" to the gNB or network. The device capability may include at least the number of "device panels". In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed.

Two antenna ports are said to be quasi co-located ("QCL") if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. The QCL Type can indicate which channel properties are the same between the two reference signals (e.g., on the two antenna ports). Thus, the reference signals can be linked to each other with respect to what the UE can assume about their channel statistics or QCL properties. For example, qcl-Type may take one of the following values:

'QCL-TypeA': {Doppler shift, Doppler spread, average delay, delay spread}

'QCL-TypeB': {Doppler shift, Doppler spread}

'QCL-TypeC': {Doppler shift, average delay}

'QCL-TypeD': {Spatial Rx parameter}

Spatial Rx parameters may include one or more of: angle of arrival ("AoA") Dominant AoA, average AoA, angular spread, Power Angular Spectrum (PAS) of AoA, average AoD (angle of departure), PAS of AoD, transmit/receive channel correlation, transmit/receive beamforming, spatial channel correlation etc.

The QCL-TypeA, QCL-TypeB and QCL-TypeC may be applicable for all carrier frequencies, but the QCL-TypeD may be applicable only in higher carrier frequencies (e.g., mmWave, FR2 and beyond), where essentially the UE may not be able to perform omni-directional transmission, e.g., the UE would need to form beams for directional transmission. A QCL-TypeD between two reference signals A and B, the reference signal A is considered to be spatially co-located with reference signal B and the UE may assume that the reference signals A and B can be received with the same spatial filter (e.g., with the same RX beamforming weights).

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state (Transmission Configuration Indication) associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. The TCI describes which reference signals are used as QCL source, and what QCL properties can be derived from each reference signal. A device can receive a configuration of a plurality of transmission configuration indicator states for a serving cell for transmissions on the serving cell. In some of the embodiments described, a TCI state comprises at least one source RS to provide a reference (UE assumption) for determining QCL and/or spatial filter.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

Figure 9:
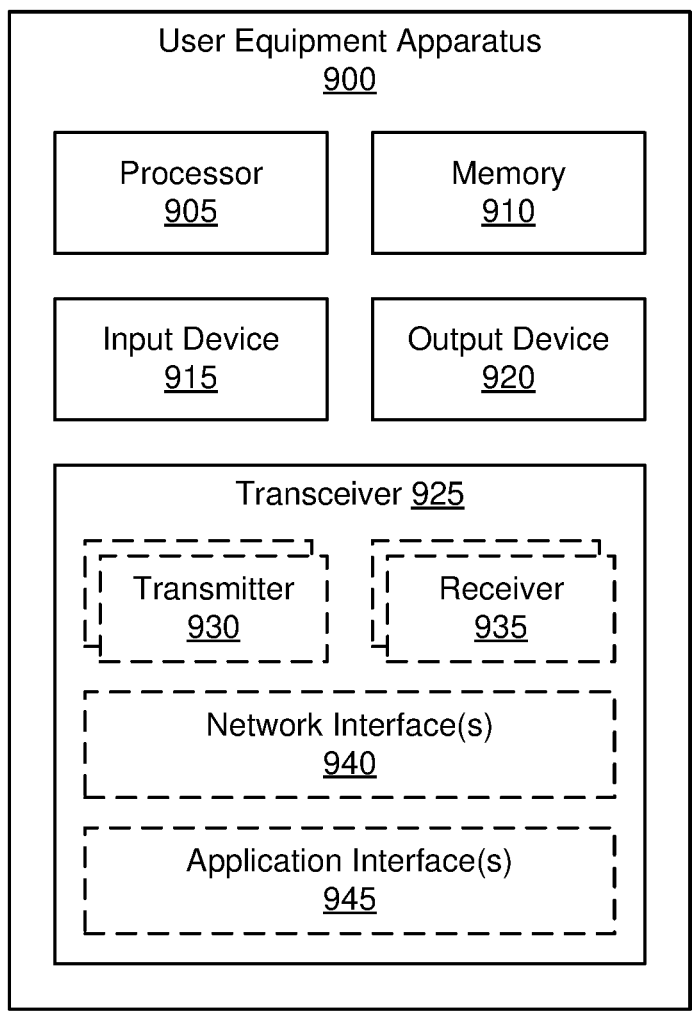
FIG. 9 is a block diagram illustrating one embodiment of a user equipment apparatus that may be used for channel state information reporting for multiple transmit/receive points and frequency division duplex reciprocity.

FIG. 9 depicts a user equipment apparatus 900 that may be used for channel state information reporting for multiple transmit/receive points and frequency division duplex reciprocity, according to embodiments of the disclosure. In various embodiments, the user equipment apparatus 900 is used to implement one or more of the solutions described above. The user equipment apparatus 900 may be one embodiment of the remote unit 105 and/or the UE 205, described above. Furthermore, the user equipment apparatus 900 may include a processor 905, a memory 910, an input device 915, an output device 920, and a transceiver 925.

In some embodiments, the input device 915 and the output device 920 are combined into a single device, such as a touchscreen. In certain embodiments, the user equipment apparatus 900 may not include any input device 915 and/or output device 920. In various embodiments, the user equipment apparatus 900 may include one or more of: the processor 905, the memory 910, and the transceiver 925, and may not include the input device 915 and/or the output device 920.

As depicted, the transceiver 925 includes at least one transmitter 930 and at least one receiver 935. In some embodiments, the transceiver 925 communicates with one or more cells (or wireless coverage areas) supported by one or more base units 121. In various embodiments, the transceiver 925 is operable on unlicensed spectrum. Moreover, the transceiver 925 may include multiple UE panel supporting one or more beams. Additionally, the transceiver 925 may support at least one network interface 940 and/or application interface 945. The application interface(s) 945 may support one or more APIs. The network interface(s) 940 may support 3GPP reference points, such as Uu, N1, PC5, etc. Other network interfaces 940 may be supported, as understood by one of ordinary skill in the art.

The processor 905, in one embodiment, may include any known controller capable of executing computer-readable instructions and/or capable of performing logical operations. For example, the processor 905 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 905 executes instructions stored in the memory 910 to perform the methods and routines described herein. The processor 905 is communicatively coupled to the memory 910, the input device 915, the output device 920, and the transceiver 925. In certain embodiments, the processor 905 may include an application processor (also known as "main processor") which manages application-domain and operating system ("OS") functions and a baseband processor (also known as "baseband radio processor") which manages radio functions.

In various embodiments, the processor 905 and/or transceiver 925 controls the user equipment apparatus 900 to implement the above-described UE behaviors. In one embodiment, the transceiver 925 receives, from a mobile wireless communication network, a channel state information ("CSI") reporting configuration, the CSI reporting configuration comprising an indicator of multi-point transmission. In one embodiment, the transceiver 925 receives, from the mobile wireless communication network, a configuration comprising at least two groups of channel measurement resources ("CMRs").

In one embodiment, the processor 905 that determines at least one CSI report based on the at least two groups of CMRs, the at least one CSI report is mapped to a transmission hypothesis corresponding to one of a single-point transmission and a multi-point transmission. In one embodiment, the transceiver 925 transmits the at least one CSI report to the mobile wireless communication network, the at least one CSI report ordered according to a predefined priority.

In one embodiment, the processor 905 determines the predefined priority for the at least one CSI report based on a priority function.

In one embodiment, the priority function comprises a parameter corresponding to a number of precoder matrix indicators ("PMIs") within the at least one CSI report.

In one embodiment, the priority function comprises a parameter corresponding to a non-zero power ("NZP") CSI reference signal ("CSI-RS") identifier ("ID") for the CMRs.

In one embodiment, the priority function comprises a parameter corresponding to an order of the CMRs within the CSI resource setting.

In one embodiment, the CMRs are grouped into two CMR groups.

In one embodiment, a subset of the CMRs in each of the groups of CMRs corresponds to a single-point transmission hypothesis.

In one embodiment, a subset of the CMRs in each of the groups of CMRs corresponds to a multi-point/joint transmission hypothesis.

In one embodiment, CMRs in a group corresponding to a single-point transmission hypothesis and a multi-point/joint transmission hypothesis are mutually exclusive.

In one embodiment, the subset of the CMRs in a first of the two CMR groups has a same size as the subset of the CMRs in a second of the two CMR groups.

In one embodiment, each member of the subset of the CMRs in the first group is paired with a distinct member of the subset of the CMRs in the second group such that there is a one-to-one mapping between the CMRs of the two subset groups.

In one embodiment, the indicator of multi-point transmission comprises a higher-layer parameter received within a CSI reporting configuration.

In one embodiment, a single-point transmission corresponds to a CSI report with one precoder matrix indicator ("PMI"), and wherein a multi-point/joint transmission corresponds to a CSI report with two PMIs.

The memory 910, in one embodiment, is a computer readable storage medium. In some embodiments, the memory 910 includes volatile computer storage media. For example, the memory 910 may include a RAM, including dynamic RAM ("DRAM"), synchronous dynamic RAM ("SDRAM"), and/or static RAM ("SRAM"). In some embodiments, the memory 910 includes non-volatile computer storage media. For example, the memory 910 may include a hard disk drive, a flash memory, or any other suitable non-volatile computer storage device. In some embodiments, the memory 910 includes both volatile and non-volatile computer storage media.

In some embodiments, the memory 910 stores data related to channel state information reporting for multiple transmit/receive points and frequency division duplex reciprocity. For example, the memory 910 may store various parameters, panel/beam configurations, resource assignments, policies, and the like as described above. In certain embodiments, the memory 910 also stores program code and related data, such as an operating system or other controller algorithms operating on the user equipment apparatus 900.

The input device 915, in one embodiment, may include any known computer input device including a touch panel, a button, a keyboard, a stylus, a microphone, or the like. In some embodiments, the input device 915 may be integrated with the output device 920, for example, as a touchscreen or similar touch-sensitive display. In some embodiments, the input device 915 includes a touchscreen such that text may be input using a virtual keyboard displayed on the touchscreen and/or by handwriting on the touchscreen. In some embodiments, the input device 915 includes two or more different devices, such as a keyboard and a touch panel.

The output device 920, in one embodiment, is designed to output visual, audible, and/or haptic signals. In some embodiments, the output device 920 includes an electronically controllable display or display device capable of outputting visual data to a user. For example, the output device 920 may include, but is not limited to, an LCD display, an LED display, an OLED display, a projector, or similar display device capable of outputting images, text, or the like to a user. As another, non-limiting, example, the output device 920 may include a wearable display separate from, but communicatively coupled to, the rest of the user equipment apparatus 900, such as a smart watch, smart glasses, a heads-up display, or the like. Further, the output device 920 may be a component of a smart phone, a personal digital assistant, a television, a table computer, a notebook (laptop) computer, a personal computer, a vehicle dashboard, or the like.

In certain embodiments, the output device 920 includes one or more speakers for producing sound. For example, the output device 920 may produce an audible alert or notification (e.g., a beep or chime). In some embodiments, the output device 920 includes one or more haptic devices for producing vibrations, motion, or other haptic feedback. In some embodiments, all, or portions of the output device 920 may be integrated with the input device 915. For example, the input device 915 and output device 920 may form a touchscreen or similar touch-sensitive display. In other embodiments, the output device 920 may be located near the input device 915.

The transceiver 925 communicates with one or more network functions of a mobile communication network via one or more access networks. The transceiver 925 operates under the control of the processor 905 to transmit messages, data, and other signals and also to receive messages, data, and other signals. For example, the processor 905 may selectively activate the transceiver 925 (or portions thereof) at particular times in order to send and receive messages.

The transceiver 925 includes at least transmitter 930 and at least one receiver 935. One or more transmitters 930 may be used to provide UL communication signals to a base unit 121, such as the UL transmissions described herein. Similarly, one or more receivers 935 may be used to receive DL communication signals from the base unit 121, as described herein. Although only one transmitter 930 and one receiver 935 are illustrated, the user equipment apparatus 900 may have any suitable number of transmitters 930 and receivers 935. Further, the transmitter(s) 930 and the receiver(s) 935 may be any suitable type of transmitters and receivers. In one embodiment, the transceiver 925 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 925, transmitters 930, and receivers 935 may be implemented as physically separate components that access a shared hardware resource and/or software resource, such as for example, the network interface 940.

In various embodiments, one or more transmitters 930 and/or one or more receivers 935 may be implemented and/or integrated into a single hardware component, such as a multi-transceiver chip, a system-on-a-chip, an ASIC, or other type of hardware component. In certain embodiments, one or more transmitters 930 and/or one or more receivers 935 may be implemented and/or integrated into a multi-chip module. In some embodiments, other components such as the network interface 940 or other hardware components/circuits may be integrated with any number of transmitters 930 and/or receivers 935 into a single chip. In such embodiment, the transmitters 930 and receivers 935 may be logically configured as a transceiver 925 that uses one more common control signals or as modular transmitters 930 and receivers 935 implemented in the same hardware chip or in a multi-chip module.

Figure 10:
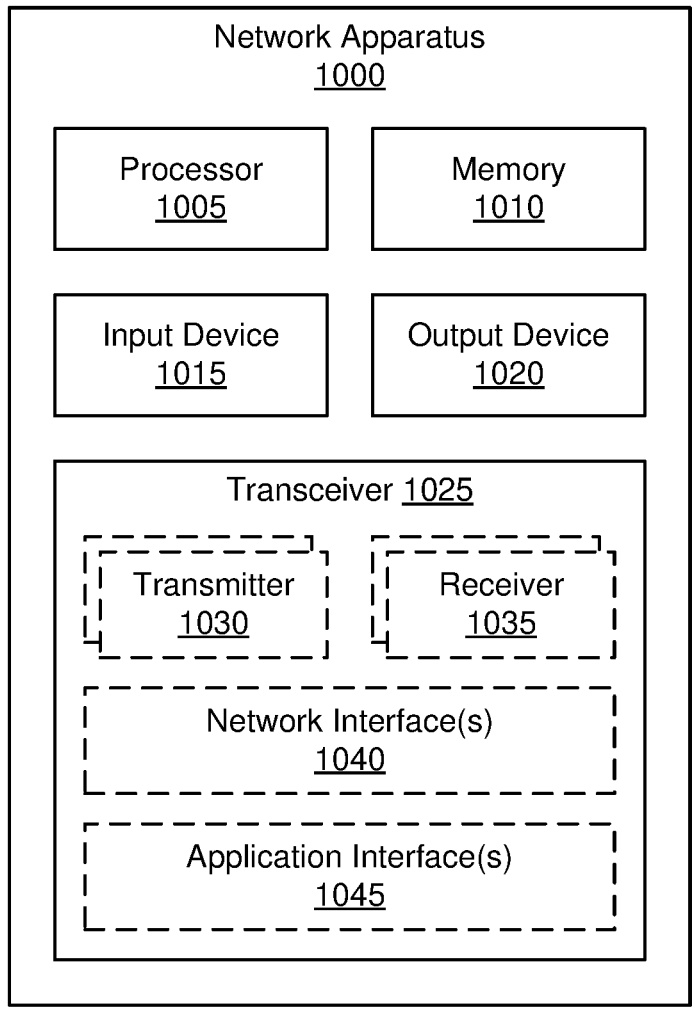
FIG. 10 is a block diagram illustrating one embodiment of a network apparatus that may be used for channel state information reporting for multiple transmit/receive points and frequency division duplex reciprocity.

FIG. 10 depicts a network apparatus 1000 that may be used for channel state information reporting for multiple transmit/receive points and frequency division duplex reciprocity, according to embodiments of the disclosure. In one embodiment, network apparatus 1000 may be one implementation of a RAN node, such as the base unit 121, the RAN node 210, or gNB, described above. Furthermore, the base network apparatus 1000 may include a processor 1005, a memory 1010, an input device 1015, an output device 1020, and a transceiver 1025.

In some embodiments, the input device 1015 and the output device 1020 are combined into a single device, such as a touchscreen. In certain embodiments, the network apparatus 1000 may not include any input device 1015 and/or output device 1020. In various embodiments, the network apparatus 1000 may include one or more of: the processor 1005, the memory 1010, and the transceiver 1025, and may not include the input device 1015 and/or the output device 1020.

As depicted, the transceiver 1025 includes at least one transmitter 1030 and at least one receiver 1035. Here, the transceiver 1025 communicates with one or more remote units 105. Additionally, the transceiver 1025 may support at least one network interface 1040 and/or application interface 1045. The application interface(s) 1045 may support one or more APIs. The network interface(s) 1040 may support 3GPP reference points, such as Uu, N1, N2 and N3. Other network interfaces 1040 may be supported, as understood by one of ordinary skill in the art.

The processor 1005, in one embodiment, may include any known controller capable of executing computer-readable instructions and/or capable of performing logical operations. For example, the processor 1005 may be a microcontroller, a microprocessor, a CPU, a GPU, an auxiliary processing unit, a FPGA, or similar programmable controller. In some embodiments, the processor 1005 executes instructions stored in the memory 1010 to perform the methods and routines described herein. The processor 1005 is communicatively coupled to the memory 1010, the input device 1015, the output device 1020, and the transceiver 1025. In certain embodiments, the processor 805 may include an application processor (also known as "main processor") which manages application-domain and operating system ("OS") functions and a baseband processor (also known as "baseband radio processor") which manages radio function.

In various embodiments, the processor 1005 and/or transceiver 1025 controls the network apparatus 1000 to implement the above-described network apparatus behaviors. In one embodiment, the transceiver 1025 sends, to a user equipment ("UE") device, a channel state information ("CSI") reporting configuration, the CSI reporting configuration comprising an indicator of multi-point transmission. In one embodiment, the transceiver 1025 sends, to the UE device, a configuration comprising at least two groups of channel measurement resources ("CMRs"). In one embodiment, the transceiver 1025 receives, from the UE device, at least one CSI report, the at least one CSI report ordered according to a predefined priority.

In various embodiments, the network apparatus 1000 is a RAN node (e.g., gNB) that includes a transceiver 1025 that sends, to a user equipment ("UE") device, an indication that channel state information ("CSI") corresponding to multiple transmit/receives points ("TRPs") is to be reported and receives at least one CSI report from the UE corresponding to one or more of the multiple TRPs, the CSI report generated according to the CSI reporting configuration, the at least one CSI report comprising a CSI-reference signal ("CSI-RS") resource indicator ("CRI").

The memory 1010, in one embodiment, is a computer readable storage medium. In some embodiments, the memory 1010 includes volatile computer storage media. For example, the memory 1010 may include a RAM, including dynamic RAM ("DRAM"), synchronous dynamic RAM ("SDRAM"), and/or static RAM ("SRAM"). In some embodiments, the memory 1010 includes non-volatile computer storage media. For example, the memory 1010 may include a hard disk drive, a flash memory, or any other suitable non-volatile computer storage device. In some embodiments, the memory 1010 includes both volatile and non-volatile computer storage media.

In some embodiments, the memory 1010 stores data related to channel state information reporting for multiple transmit/receive points and frequency division duplex reciprocity. For example, the memory 1010 may store parameters, configurations, resource assignments, policies, and the like, as described above. In certain embodiments, the memory 1010 also stores program code and related data, such as an operating system or other controller algorithms operating on the network apparatus 1000.

The input device 1015, in one embodiment, may include any known computer input device including a touch panel, a button, a keyboard, a stylus, a microphone, or the like. In some embodiments, the input device 1015 may be integrated with the output device 1020, for example, as a touchscreen or similar touch-sensitive display. In some embodiments, the input device 1015 includes a touchscreen such that text may be input using a virtual keyboard displayed on the touchscreen and/or by handwriting on the touchscreen. In some embodiments, the input device 1015 includes two or more different devices, such as a keyboard and a touch panel.

The output device 1020, in one embodiment, is designed to output visual, audible, and/or haptic signals. In some embodiments, the output device 1020 includes an electronically controllable display or display device capable of outputting visual data to a user. For example, the output device 1020 may include, but is not limited to, an LCD display, an LED display, an OLED display, a projector, or similar display device capable of outputting images, text, or the like to a user. As another, non-limiting, example, the output device 1020 may include a wearable display separate from, but communicatively coupled to, the rest of the network apparatus 1000, such as a smart watch, smart glasses, a heads-up display, or the like. Further, the output device 1020 may be a component of a smart phone, a personal digital assistant, a television, a table computer, a notebook (laptop) computer, a personal computer, a vehicle dashboard, or the like.

In certain embodiments, the output device 1020 includes one or more speakers for producing sound. For example, the output device 1020 may produce an audible alert or notification (e.g., a beep or chime). In some embodiments, the output device 1020 includes one or more haptic devices for producing vibrations, motion, or other haptic feedback. In some embodiments, all, or portions of the output device 1020 may be integrated with the input device 1015. For example, the input device 1015 and output device 1020 may form a touchscreen or similar touch-sensitive display. In other embodiments, the output device 1020 may be located near the input device 1015.

The transceiver 1025 includes at least transmitter 1030 and at least one receiver 1035. One or more transmitters 1030 may be used to communicate with the UE, as described herein. Similarly, one or more receivers 1035 may be used to communicate with network functions in the NPN, PLMN and/or RAN, as described herein. Although only one transmitter 1030 and one receiver 1035 are illustrated, the network apparatus 1000 may have any suitable number of transmitters 1030 and receivers 1035. Further, the transmitter(s) 1030 and the receiver(s) 1035 may be any suitable type of transmitters and receivers.

Figure 11:
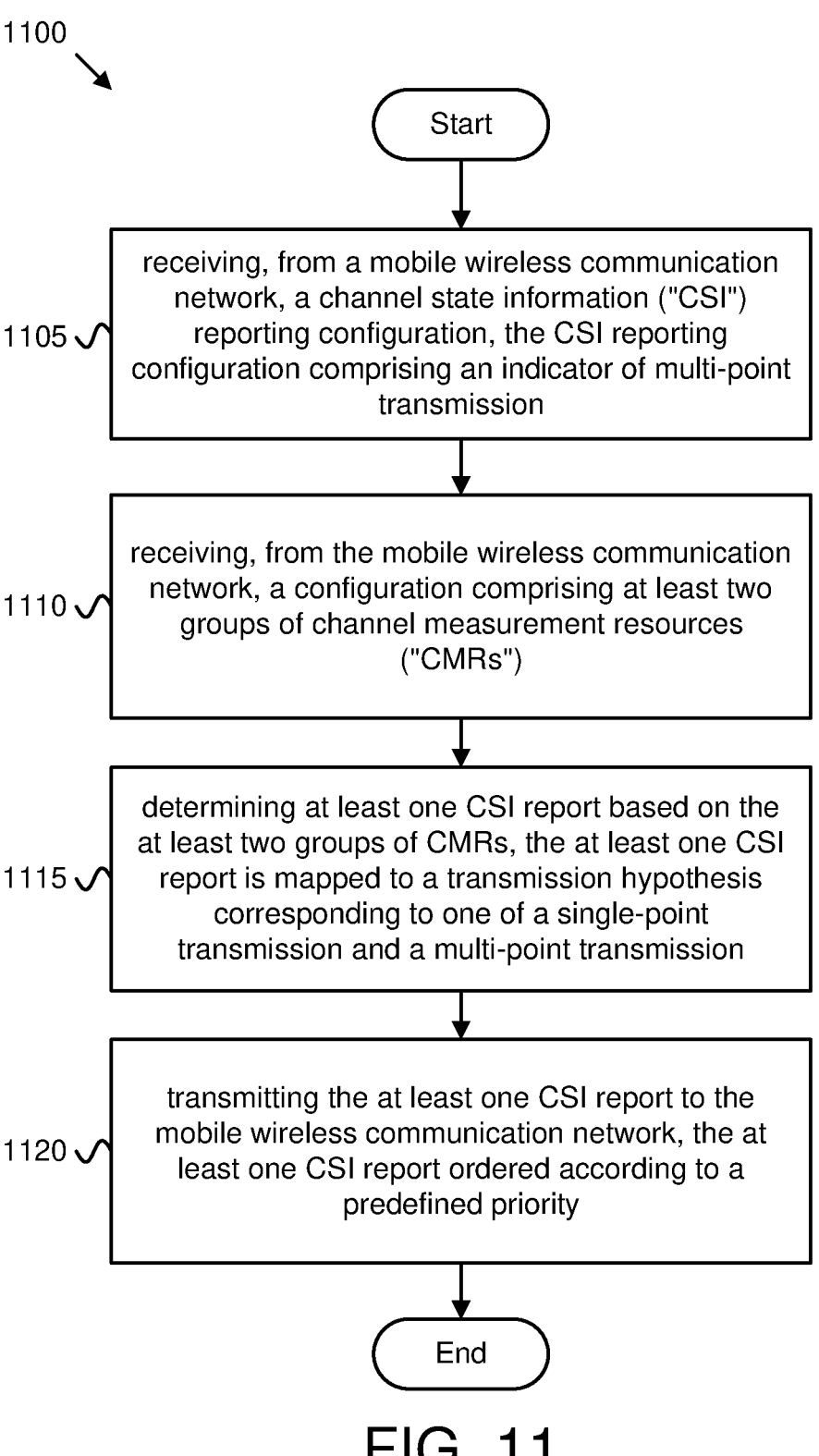
FIG. 11 is a flowchart diagram illustrating one embodiment of a method for channel state information reporting for multiple transmit/receive points and frequency division duplex reciprocity.

FIG. 11 is a flowchart diagram of a method 1100 for channel state information reporting for multiple transmit/receive points and frequency division duplex reciprocity. The method 1100 may be performed by a UE as described herein, for example, the remote unit 105, the UE 205 and/or the user equipment apparatus 900. In some embodiments, the method 1100 may be performed by a processor executing program code, for example, a microcontroller, a microprocessor, a CPU, a GPU, an auxiliary processing unit, a FPGA, or the like.

The method 1100, in one embodiment, includes receiving 1105, from a mobile wireless communication network, a channel state information ("CSI") reporting configuration, the CSI reporting configuration comprising an indicator of multi-point transmission. In one embodiment, the method 1100 includes receiving 1110, from the mobile wireless communication network, a configuration comprising at least two groups of channel measurement resources ("CMRs"). In one embodiment, the method 1100 includes determining 1115 at least one CSI report based on the at least two groups of CMRs, the at least one CSI report is mapped to a transmission hypothesis corresponding to one of a single-point transmission and a multi-point transmission. In one embodiment, the method 1100 includes transmitting 1120 the at least one CSI report to the mobile wireless communication network, the at least one CSI report ordered according to a predefined priority. The method 1100 ends.

FIG. 12 is a flowchart diagram of a method 1200 for channel state information reporting for multiple transmit/receive points and frequency division duplex reciprocity. The method 1200 may be performed by a network device described herein, for example, a gNB, a base station, and/or the network equipment apparatus 1000. In some embodiments, the method 1200 may be performed by a processor executing program code, for example, a microcontroller, a microprocessor, a CPU, a GPU, an auxiliary processing unit, a FPGA, or the like.

In one embodiment, the method 1200 includes sending 1205, to a user equipment ("UE") device, a channel state information ("CSI") reporting configuration, the CSI reporting configuration comprising an indicator of multi-point transmission. In one embodiment, the method 1200 includes sending 1210, to the UE device, a configuration comprising at least two groups of channel measurement resources ("CMRs"). In one embodiment, the method 1200 includes receiving 1215, from the UE device, at least one CSI report, the at least one CSI report ordered according to a predefined priority. The method 1200 ends.

In one embodiment, a first apparatus for channel state information reporting for multiple transmit/receive points and frequency division duplex reciprocity may be embodied as a UE as described herein, for example, the remote unit 105, the UE 205 and/or the user equipment apparatus 900. In some embodiments, the first apparatus may include a processor executing program code, for example, a microcontroller, a microprocessor, a CPU, a GPU, an auxiliary processing unit, a FPGA, or the like.

The first apparatus, in one embodiment, includes a transceiver that receives, from a mobile wireless communication network, a channel state information ("CSI") reporting configuration, the CSI reporting configuration comprising an indicator of multi-point transmission. In one embodiment, the transceiver receives, from the mobile wireless communication network, a configuration comprising at least two groups of channel measurement resources ("CMRs").

In one embodiment, the first apparatus includes a processor that determines at least one CSI report based on the at least two groups of CMRs, the at least one CSI report is mapped to a transmission hypothesis corresponding to one of a single-point transmission and a multi-point transmission. In one embodiment, the transceiver transmits the at least one CSI report to the mobile wireless communication network, the at least one CSI report ordered according to a predefined priority.

In one embodiment, the processor determines the predefined priority for the at least one CSI report based on a priority function.

In one embodiment, the priority function comprises a parameter corresponding to a number of precoder matrix indicators ("PMIs") within the at least one CSI report.

In one embodiment, the priority function comprises a parameter corresponding to a non-zero power ("NZP") CSI reference signal ("CSI-RS") identifier ("ID") for the CMRs.

In one embodiment, the priority function comprises a parameter corresponding to an order of the CMRs within the CSI resource setting.

In one embodiment, the CMRs are grouped into two CMR groups.

In one embodiment, a subset of the CMRs in each of the groups of CMRs corresponds to a single-point transmission hypothesis.

In one embodiment, a subset of the CMRs in each of the groups of CMRs corresponds to a multi-point/joint transmission hypothesis.

In one embodiment, CMRs in a group corresponding to a single-point transmission hypothesis and a multi-point/joint transmission hypothesis are mutually exclusive.

In one embodiment, the subset of the CMRs in a first of the two CMR groups has a same size as the subset of the CMRs in a second of the two CMR groups.

In one embodiment, each member of the subset of the CMRs in the first group is paired with a distinct member of the subset of the CMRs in the second group such that there is a one-to-one mapping between the CMRs of the two subset groups.

In one embodiment, the indicator of multi-point transmission comprises a higher-layer parameter received within a CSI reporting configuration.

In one embodiment, a single-point transmission corresponds to a CSI report with one precoder matrix indicator ("PMI"), and wherein a multi-point/joint transmission corresponds to a CSI report with two PMIs.

In one embodiment, a first method for channel state information reporting for multiple transmit/receive points and frequency division duplex reciprocity may be performed by a UE as described herein, for example, the remote unit 105, the UE 205 and/or the user equipment apparatus 800. In some embodiments, the first method may be performed by a processor executing program code, for example, a microcontroller, a microprocessor, a CPU, a GPU, an auxiliary processing unit, a FPGA, or the like.

The first method, in one embodiment, receives, from a mobile wireless communication network, a channel state information ("CSI") reporting configuration, the CSI reporting configuration comprising an indicator of multi-point transmission. In one embodiment, the first method receives, from the mobile wireless communication network, a configuration comprising at least two groups of channel measurement resources ("CMRs").

In one embodiment, the first method determines at least one CSI report based on the at least two groups of CMRs, the at least one CSI report is mapped to a transmission hypothesis corresponding to one of a single-point transmission and a multi-point transmission. In one embodiment, the first method transmits the at least one CSI report to the mobile wireless communication network, the at least one CSI report ordered according to a predefined priority.

In one embodiment, the first method determines the predefined priority for the at least one CSI report based on a priority function.

In one embodiment, the priority function comprises a parameter corresponding to a number of precoder matrix indicators ("PMIs") within the at least one CSI report.

In one embodiment, the priority function comprises a parameter corresponding to a non-zero power ("NZP") CSI reference signal ("CSI-RS") identifier ("ID") for the CMRs.

In one embodiment, the priority function comprises a parameter corresponding to an order of the CMRs within the CSI resource setting.

In one embodiment, the CMRs are grouped into two CMR groups.

In one embodiment, a subset of the CMRs in each of the groups of CMRs corresponds to a single-point transmission hypothesis.

In one embodiment, a subset of the CMRs in each of the groups of CMRs corresponds to a multi-point/joint transmission hypothesis.

In one embodiment, CMRs in a group corresponding to a single-point transmission hypothesis and a multi-point/joint transmission hypothesis are mutually exclusive.

In one embodiment, the subset of the CMRs in a first of the two CMR groups has a same size as the subset of the CMRs in a second of the two CMR groups.

In one embodiment, each member of the subset of the CMRs in the first group is paired with a distinct member of the subset of the CMRs in the second group such that there is a one-to-one mapping between the CMRs of the two subset groups.

In one embodiment, the indicator of multi-point transmission comprises a higher-layer parameter received within a CSI reporting configuration.

In one embodiment, a single-point transmission corresponds to a CSI report with one precoder matrix indicator ("PMI"), and wherein a multi-point/joint transmission corresponds to a CSI report with two PMIs.

A second apparatus for channel state information reporting for multiple transmit/receive points and frequency division duplex reciprocity may be embodied as a network device described herein, for example, a gNB, a base station, and/or the network equipment apparatus 1000. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver that sends, to a user equipment ("UE") device, a channel state information ("CSI") reporting configuration, the CSI reporting configuration comprising an indicator of multi-point transmission. In one embodiment, the transceiver sends, to the UE device, a configuration comprising at least two groups of channel measurement resources ("CMRs"). In one embodiment, the transceiver receives, from the UE device, at least one CSI report, the at least one CSI report ordered according to a predefined priority.

A second method for channel state information reporting for multiple transmit/receive points and frequency division duplex reciprocity may be performed by a network device described herein, for example, a gNB, a base station, and/or the network equipment apparatus 1000. In some embodiments, the second method may be performed by a processor executing program code, for example, a microcontroller, a microprocessor, a CPU, a GPU, an auxiliary processing unit, a FPGA, or the like.

In one embodiment, the second method sends, to a user equipment ("UE") device, a channel state information ("CSI") reporting configuration, the CSI reporting configuration comprising an indicator of multi-point transmission. In one embodiment, the second method sends, to the UE device, a configuration comprising at least two groups of channel measurement resources ("CMRs"). In one embodiment, the second method receives, from the UE device, at least one CSI report, the at least one CSI report ordered according to a predefined priority.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
  at least one memory; and
  at least one processor coupled with the at least one memory and configured to cause the UE to:
    receive a channel state information ("CSI") reporting configuration comprising a higher-layer parameter that is indicative of multi-point transmission;
    receive a configuration comprising at least two groups of channel measurement resources ("CMRs"), wherein the at least two groups of CMRs correspond to a plurality of transmission reception points ("TRPs");
    determine, based on the at least two groups of CMRs, at least one CSI report mapped to a transmission hypothesis corresponding to a single-point transmission hypothesis, a multi-point transmission hypothesis, or a combination thereof, wherein:
      a first subset of the CMRs in each of the at least two groups of CMRs corresponds to the single-point transmission hypothesis, and
      a second subset of the CMRs in each of the at least two groups of CMRs corresponds to the multi-point transmission hypothesis; and
    transmit the at least one CSI report.

2. The UE of claim 1, wherein a first subset of CMRs of a first group of the at least two groups of CMRs and a second subset of CMRs of a second group of the at least two groups of CMRs correspond to the single-point transmission hypothesis.

3. The UE of claim 1, wherein a first subset of CMRs of a first group of the at least two groups of CMRs and a second subset of CMRs of a second group of the at least two groups of CMRs correspond to the multi-point transmission hypothesis.

4. The UE of claim 1, wherein CMRs in a group corresponding to the single-point transmission hypothesis and the multi-point transmission hypothesis are mutually exclusive.

5. The UE of claim 1, wherein a first subset of CMRs of a first group of the at least two groups of CMRs has a same size as a second subset of CMRs of a second group of the at least two groups of CMRs.

6. The UE of claim 5, wherein each member of the first subset of CMRs of the first group of CMRs is paired with a distinct member of the second subset of CMRs of the second group of CMRs resulting in a one-to-one mapping between the first and second subsets of CMRs of the two groups of CMRs.

7. The UE of claim 1, wherein the higher-layer parameter that is indicative of multi-point transmission is received within a CSI reporting configuration.

8. The UE of claim 1, wherein a single-point transmission corresponds to a CSI report with one precoder matrix indicator ("PMI"), and wherein a multi-point transmission corresponds to a CSI report with two PMIs.

9. A method performed by a user equipment ("UE"), the method comprising:
  receiving a channel state information ("CSI") reporting configuration comprising a higher-layer parameter that is indicative of multi-point transmission;
  receiving a configuration comprising at least two groups of channel measurement resources ("CMRs"), wherein the at least two groups of CMRs correspond to a plurality of transmission reception points ("TRPs");
  determining, based on the at least two groups of CMRs, at least one CSI report mapped to a transmission hypothesis corresponding to a single-point transmission hypothesis, a multi-point transmission hypothesis, or a combination thereof, wherein:
    a first subset of the CMRs in each of the at least two groups of CMRs corresponds to the single-point transmission hypothesis, and
    a second subset of the CMRs in each of the at least two groups of CMRs corresponds to the multi-point transmission hypothesis; and
  transmitting the at least one CSI report.

10. A base station for wireless communication, comprising:
  at least one memory; and
  at least one processor coupled with the at least one memory and configured to cause the base station to:
    send a channel state information ("CSI") reporting configuration comprising a higher-layer parameter that is indicative of multi-point transmission;
    send a configuration comprising at least two groups of channel measurement resources ("CMRs"), wherein the at least two groups of CMRs correspond to a plurality of transmission reception points ("TRPs"); and
    receive at least one CSI report determined based on the at least two groups of CMRs, the at least one CSI report mapped to a transmission hypothesis corresponding to one of a single-point transmission hypothesis or a multi-point transmission hypothesis, wherein the at least one CSI report is based on:
      a first subset of the CMRs in each of the two groups corresponding to the single-point transmission hypothesis, and
      a second subset of the CMRs in each of the two groups corresponding to the multi-point transmission hypothesis.

11. The method of claim 9, wherein a first subset of CMRs of a first group of the at least two groups of CMRs and a second subset of CMRs of a second group of the at least two groups of CMRs correspond to the single-point transmission hypothesis.

12. The method of claim 9, wherein a first subset of the CMRs of a first group of the at least two groups of CMRs and a second subset of CMRs of a second group of the at least two groups of CMRs correspond to the multi-point transmission hypothesis.

13. The method of claim 9, wherein a first subset of CMRs of a first group of the at least two groups of CMRs has a same size as a second subset of CMRs of a second group of the at least two groups of CMRs.

14. The method of claim 13, wherein each member of the first subset of CMRs in the first group of CMRs is paired with a distinct member of the second subset of the CMRs in the second group of CMRs resulting in a one-to-one mapping between the first and second subsets of CMRs of the two groups of CMRs.

15. The method of claim 9, wherein a single-point transmission corresponds to a CSI report with one precoder matrix indicator ("PMI"), and wherein a multi-point transmission corresponds to a CSI report with two PMIs.

16. A processor for wireless communication, comprising:
  at least one controller coupled with at least one memory and configured to cause the processor to:

receive a channel state information ("CSI") reporting configuration comprising a higher-layer parameter that is indicative of multi-point transmission;

receive a configuration comprising at least two groups of channel measurement resources ("CMRs"), wherein the at least two groups of CMRs correspond to a plurality of transmission reception points ("TRPs");

determine, based on the at least two groups of CMRs, at least one CSI report mapped to a transmission hypothesis corresponding to a single-point transmission hypothesis, a multi-point transmission hypothesis, or a combination thereof, wherein:

a first subset of the CMRs in each of the at least two groups of CMRs corresponds to the single-point transmission hypothesis, and a second subset of the CMRs in each of the at least two groups of CMRs corresponds to the multi-point transmission hypothesis; and transmit the at least one CSI report, the at least one CSI report.

17. The processor of claim 16, wherein a first subset of CMRs of a first group of the at least two groups of CMRs and a second subset of CMRs of a second group of the at least two groups of CMRs correspond to the single-point transmission hypothesis.

18. The processor of claim 16, wherein a first subset of the CMRs of a first group of the at least two groups of CMRs and a second subset of CMRs of a second group of the at least two groups of CMRs correspond to the multi-point transmission hypothesis.

19. The processor of claim 16, wherein a first subset of CMRs of a first group of the at least two groups of CMRs has a same size as a second subset of CMRs of a second group of the at least two groups of CMRs.

20. The processor of claim 19, wherein each member of the first subset of CMRs in the first group of CMRs is paired with a distinct member of the second subset of the CMRs in the second group of CMRs resulting in a one-to-one mapping between the first and second subsets of CMRs of the two groups of CMRs.

\*   \*   \*   \*   \*